(12) United States Patent
Lert, Jr. et al.

(10) Patent No.: US 10,984,497 B2
(45) Date of Patent: Apr. 20, 2021

(54) AUTOMATED PROXY PICKER SYSTEM FOR NON-FUNGIBLE GOODS

(71) Applicant: ALERT INNOVATION INC., North Billerica, MA (US)

(72) Inventors: John G. Lert, Jr., Wakefield, MA (US); William J. Fosnight, Windham, NH (US)

(73) Assignee: Alert Innovation Inc., North Billerica, MA (US)

( * ) Notice: Subject to any disclaimer, the term of this patent is extended or adjusted under 35 U.S.C. 154(b) by 26 days.

(21) Appl. No.: 15/884,677

(22) Filed: Jan. 31, 2018

(65) Prior Publication Data

US 2018/0218469 A1 Aug. 2, 2018

Related U.S. Application Data

(60) Provisional application No. 62/452,801, filed on Jan. 31, 2017.

(51) Int. Cl.
*G06F 7/00* (2006.01)
*G06Q 50/28* (2012.01)
(Continued)

(52) U.S. Cl.
CPC .......... *G06Q 50/28* (2013.01); *B65G 1/1371* (2013.01); *B65G 1/1375* (2013.01); *B65G 47/90* (2013.01);
(Continued)

(58) Field of Classification Search
CPC ............... G06Q 50/28; G06Q 30/0633; G06Q 30/0623; G06Q 30/06; G06Q 30/0643; G06Q 30/0635; B65G 1/1371; B65G 1/1375; B65G 47/90; Y10S 901/31; Y10S 901/01; Y10S 901/16
(Continued)

(56) References Cited

U.S. PATENT DOCUMENTS 6,026,376 A 2/2000 Kenney
10,504,165 B1 * 12/2019 Goyal ................ G01G 19/4144
(Continued)

FOREIGN PATENT DOCUMENTS

WO 2017223137 A1 12/2017
WO 2017223168 A1 12/2017

OTHER PUBLICATIONS

International Search Report and Written Opinion dated Mar. 29, 2018 in International Patent Application No. PCT/US2018/016276.
(Continued)

*Primary Examiner* — Yolanda R Cumbess
(74) *Attorney, Agent, or Firm* — Vierra Magen Marcus LLP

(57) ABSTRACT

A system and method for providing proxy picking of non-fungible goods within an automated storage and retrieval system is provided, which repurposes one or more automated mobile robots operating within the automated inventory management system to perform a plurality of tasks across multiple different areas of an automated store. The proxy picking system and method are configured to pick individually identified non-fungible goods according to a customer selection on an ordering screen based on measured attributes and images of the goods, the attributes selected by the customer.

26 Claims, 21 Drawing Sheets

(51) Int. Cl.
  *B65G 1/137*  (2006.01)
  *G06Q 30/06*  (2012.01)
  *B65G 47/90*  (2006.01)

(52) U.S. Cl.
  CPC ......... *G06Q 30/06* (2013.01); *G06Q 30/0623* (2013.01); *G06Q 30/0633* (2013.01); *G06Q 30/0635* (2013.01); *G06Q 30/0643* (2013.01); *Y10S 901/01* (2013.01); *Y10S 901/16* (2013.01); *Y10S 901/31* (2013.01)

(58) Field of Classification Search
  USPC .................................................. 700/213–216
  See application file for complete search history.

(56) References Cited

U.S. PATENT DOCUMENTS

| | | | |
|---|---|---|---|
| 2003/0177072 A1* | 9/2003 | Bared | G06Q 30/06 705/26.81 |
| 2011/0320034 A1 | 12/2011 | Dearlove et al. | |
| 2015/0310692 A1* | 10/2015 | Almada | G06Q 20/12 235/381 |
| 2016/0086255 A1 | 3/2016 | Sainfort et al. | |
| 2016/0364786 A1* | 12/2016 | Wankhede | G06Q 30/0633 |
| 2017/0043953 A1* | 2/2017 | Battles | B65G 1/1373 |
| 2018/0068374 A1* | 3/2018 | Turlay | G06Q 30/0601 |

OTHER PUBLICATIONS

Response to Office Action filed Mar. 21, 2020 in European Patent Application No. 18705288.1.

Communication pursuant to Article 94(3) EPC dated Jun. 12, 2020 in European Patent Application No. 18705288.1.

Communication pursuant to Article 94(3) EPC dated Dec. 7, 2020 in European Patent Application No. 18705288.1.

* cited by examiner

New York Strip Steaks
$9.99 / lb

Your Preferences:

1 = Weight = 16 oz
2 = Marbling
3 = Color
4 = Firmness
5 = Shape

Change preferences

Your Steaks:

Quantity = 2
Weight = 3.04 lbs
Total = $30.34

Add to Your Cart

Weight = 16.0 oz
Marbling = 8.9
Color = 8.8
Firmness = 9.0
Shape = 9.2

Weight = 16.0 oz
Marbling = 8.6
Color = 8.6
Firmness = 8.9
Shape = 9.0

Weight = 16.1 oz
Marbling = 8.1
Color = 8.9
Firmness = 8.8
Shape = 9.0

Weight = 15.9 oz
Marbling = 8.2
Color = 8.3
Firmness = 8.9
Shape = 8.9

Weight = 15.9 oz
Marbling = 8.7
Color = 8.5
Firmness = 8.9
Shape = 9.0

Weight = 15.8 oz
Marbling = 8.7
Color = 8.1
Firmness = 8.9
Shape = 8.8

Weight = 15.6 oz
Marbling = 8.5
Color = 8.8
Firmness = 8.6
Shape = 8.8

Weight = 15.6 oz
Marbling = 8.3
Color = 8.1
Firmness = 8.8
Shape = 8.9

Weight = 16.5 oz
Marbling = 8.7
Color = 8.7
Firmness = 9.0
Shape = 8.9

Weight = 16.8 oz
Marbling = 8.8
Color = 8.8
Firmness = 8.5
Shape = 7.1

Weight = 15.4 oz
Marbling = 8.0
Color = 8.7
Firmness = 8.8
Shape = 7.9

Weight = 15.1 oz
Marbling = 7.0
Color = 8.5
Firmness = 9.0
Shape = 8.0

*Fig. 3B*

AUTOMATED PROXY PICKER SYSTEM FOR NON-FUNGIBLE GOODS

PRIORITY CLAIM

The present application claims priority to U.S. Provisional Patent Application No. 62/452,801, filed on Jan. 31, 2017, entitled "AUTOMATED PROXY PICKER SYSTEM FOR NON-FUNGIBLE GOODS," which application is incorporated by reference herein in its entirety.

FIELD OF THE INVENTION

The present invention relates to an automated proxy picking system and process for use within automated mobile robot storage and retrieval systems of an automated inventory management system, such as in an automated store. In particular, the present invention relates to an automated proxy picker system and method configured to pick specific non-fungible goods according to a customer selection and to deliver it direct to the customer.

BACKGROUND

Generally, human operated and automated inventory management systems include a plurality of vertical and/or horizontal storage racks for holding and transporting inventory. Typically, inventory is stored in boxes stacked on pallets and placed into racks. The inventory can be removed from the storage racks through a combination of human operated transportation devices, such as forklifts, and automated mobile robots configured for moving inventory in and out of the storage racks. The inventory managed by automated systems typically includes fungible items which are interchangeable. Non-fungible goods are typically stored in a store front in which customers can individually inspect the goods and select the goods according to their preferences. An example of such non-fungible goods shopping is produce in grocery stores. Although customers can order non-fungible goods, such as produce, sight unseen, it is not a popular way of shopping. Shopping for non-fungible goods without individual inspection by the customer requires that the customer accept the risk that they may not receive exactly the type of non-fungible good that they prefer and would have selected on their own. Existing methods and systems that offer picking of non-fungible goods for customers do not meet the quality and selectiveness as would be achieved by the customer themselves, which is not feasible without the automation and computer implemented system presented herein due to the associated labor cost, and opportunity for human errors throughout the process.

SUMMARY

There is a need for an improved system and method for purchasing non-fungible goods within an automated inventory management system and for online retailers. The present invention is directed toward further solutions to address this need, in addition to having other desirable characteristics. Specifically, the present invention is directed to a system and method of operation of previewing and selecting non-fungible goods for automated order fulfillment within an automated store. In particular, the present invention provides a system and method to provide customers with previews of non-fungible goods, including various characteristics about each particular non-fungible good without requiring the customer to do an in-person, hands-on inspection of said goods. Once a non-fungible good is selected by the customer, the automated fulfillment system can pick the exact non-fungible good from inventory for delivery to the customer.

In accordance with example embodiments of the present invention, an automated store includes a mock marketplace that presents fungible goods and non-fungible goods to customers for order selection, the order selection comprising one or more selection criterion distinguishing similar one or more non-fungible goods from each other. One or more picking workstations receive the one or more non-fungible goods for picking custom-picked selections. A proxy picker is disposed at the one or more picking workstations. A central control system (CCS) manages automated processes in the automated store, receives input from the mock marketplace including customer order selections, and provides instruction to the proxy picker to implement fulfillment of customers order selections. When the CCS receives the one or more selection criterion from a customer, the CCS returns one or more fungible goods matching the one or more selection criterion to the customer and the customer provides a customer order selection for a customer designated non-fungible good. The customer order selection is communicated via the CCS to the proxy picker, and the proxy picker automatically retrieves the customer designated non-fungible good from the one or more non-fungible goods and places the designated non-fungible good into a tote of a delivery bundle In accordance with aspects of the present invention, the mobile robot operating in delivery mode retrieves the delivery bundle and delivers the delivery bundle to the delivery section. The mobile robot operating in delivery mode can also retrieve the delivery bundle and delivers the delivery bundle to a designated location of a transfer station located in the delivery section.

In accordance with aspects of the present invention, the automated fulfillment section also includes a storage structure comprising a plurality of rack modules separated by aisles and having a plurality of storage levels, the storage structure storing the plurality of totes that are empty totes when empty, product totes when containing eaches, and order totes when containing orders, or combinations thereof.

In accordance with aspects of the present invention, the shopping section further comprises one or more shopping terminals for selecting one or more fungible, one or more non-fungible goods, or both, goods from the mock marketplace. The one or more shopping terminals can include an interactive hardware display with user interface enabling the intake and implementation of the customer order selection. The one or more shopping terminals can include virtual terminals displayed via a mobile application operating on a user device enabling the intake and implementation of the customer order selection.

In accordance with aspects of the present invention, the automated store further includes automated decanting robots, wherein a controller of the automated decanting robots receives input from an optical sensor device oriented at and receives optical data from the one or more non-fungible goods. The optical sensor device can include an optical spectrometer. The optical sensor device can include a digital camera. The optical sensor device can be integrated with the automated decanting robots. The optical sensor device can be in communication with the automated decanting robots and enabled to transfer data therebetween. The optical sensor device generates data that can serve as a basis for analyzing subject non-fungible goods for the one or more selection criterion. The automated decanting robots can receive input from a weight sensor device receiving weight data from the one or more non-fungible goods. The automated decanting robots can receive input from a touch sensor device receiving firmness data from the one or more non-fungible goods. The automated decanting robots can receive input from a chemical sensor device receiving odor or gas emission data from the one or more non-fungible goods.

In accordance with aspects of the present invention, the one or more selection criterion are selected from the group consisting of color, firmness, size, weight, and defects.

In accordance with aspects of the present invention, the automated store further includes a checkout section, the checkout section comprising one or more non-fungible goods drop-off stations receiving one or more non-fungible goods picked by the proxy picker from the one or more picking stations.

In accordance with aspects of the present invention, the automated store further includes one or more checkout terminals having a configuration enabling the customers to render payment for the one or more fungible goods and the one or more non-fungible-goods. The one or more checkout terminals comprise physical kiosk structures. The one or more checkout terminals comprise virtual terminals displayed via a mobile application operating on a user device.

In accordance with aspects of the present invention, the delivery section further includes a merge module that combines one or more fungible goods from the automated fulfillment section with the one or more non-fungible goods picked from the shopping section into a delivery bundle. The automated store can also includes a pickup station receiving the delivery bundle and storing the delivery bundle in an assigned location until a customer arrives to take delivery of the delivery bundle.

In accordance with aspects of the present invention, the one or more different modes of operation further comprise an order fulfillment mode and a replenishment mode wherein the order fulfillment mode comprises the mobile robot retrieving order totes from the automated fulfillment section and delivering the order totes to the delivery section, and the replenishment mode comprises the mobile robot receiving eaches of goods and depositing the eaches of goods in designated product totes.

In accordance with aspects of the present invention, the automated store further includes a non-fungible item database accessible by the CCS, the non-fungible item database storing attributes of each non-fungible good of the non-fungible goods located in the automated store correlated to a tote and/or sub-tote in which it is stored. The automated store can also include a data acquisition device that automatically captures all ascertainable attributes of the non-fungible goods and records the ascertainable attributes in the non-fungible item database. Possible attributes of each non-fungible good can be selected from the group consisting of wherein the one or more selection criterion are selected from the group consisting of color, firmness, size, weight, and defects. Each non-fungible good of the non-fungible goods can be stored in a specialized sub-tote configured to store the non-fungible good with an identifier correlated to the non-fungible good, wherein the identifier is associated with the non-fungible good in the non-fungible item database and is associated with attributes of the non-fungible good. The specialized sub-tote can include a grid compartment or a tube.

In accordance with aspects of the present invention, the automated store further includes a shopping portal accessible via the Internet. The shopping portal can present the non-fungible goods to users in association with attributes of each non-fungible good of the non-fungible goods. The shopping portal can also provide filters enabling users to enter the customer order selection having one or more selection criterion for a non-fungible good based on the attributes of each non-fungible good. The shopping portal can also provide a prioritization indicator enabling users to prioritize each of the one or more selection criterion. The shopping portal can also present images of the non-fungible goods to users. The automated store can also include a time-out feature wherein once a user selects a non-fungible good for placement in a virtual shopping cart, a predetermined time period begins to elapse during which the non-fungible good is reserved and ineligible for selection by another user. When a purchase of items is not completed prior to the predetermined time period terminating, the non-fungible good can become available for selection again by another user.

In accordance with aspects of the present invention, an each good management mechanism is provided wherein when a plurality of each goods are in a tube shaped sub-tote, the proxy picker moves at least one each good out of the way from above a selected each good in the tube shaped sub-tote, stores the at least one each good in a different tube shaped sub-tote, and updates a position of the at least one each good.

In accordance with example embodiments of the present invention, an automated store is provided. The automated store includes a building having automated an automated fulfillment section, a shopping section, and a delivery section. The automated fulfillment section includes a storage structure storing a plurality of totes and an automated fulfillment system managing handling of the plurality of totes. The shopping section includes a mock marketplace presenting fungible goods and non-fungible goods to customers for order selection, the order selection comprising one or more selection criterion distinguishing similar one or more non-fungible goods from each other. The automated store also includes a mobile robot that propels itself horizontally and vertically throughout the automated fulfillment section and the delivery section in one or more different modes of operation based on task demand, the one or more different modes of operation comprising a delivery mode, wherein the mobile robot retrieves delivery bundles and transports the delivery bundles to the delivery section. The automated store further includes one or more picking workstations that receive the one or more non-fungible goods for picking custom-picked selections, a proxy picker disposed at the one or more picking workstations, and a central control system (CCS) that manages automated processes in the automated store, the CCS receiving input from the mock marketplace including customer order selections and the CCS providing instruction to the proxy picker to implement fulfillment of customers order selections. When the CCS receives the one or more selection criterion from a customer, the CCS returns one or more fungible goods matching the one or more selection criterion to the customer and the customer provides a customer order selection for a customer designated non-fungible good. The customer order selection is communicated via the CCS to the proxy picker, and the proxy picker automatically retrieves the customer designated non-fungible good from the one or more non-fungible goods and places the designated non-fungible good into a tote of a delivery bundle.

BRIEF DESCRIPTION OF THE FIGURES

These and other characteristics of the present invention will be more fully understood by reference to the following detailed description in conjunction with the attached drawings, in which:

FIGS. 3A and 3B are illustrative depictions of an ordering screen within the automated mobile robot storage and retrieval system;

DETAILED DESCRIPTION

Figure 1:
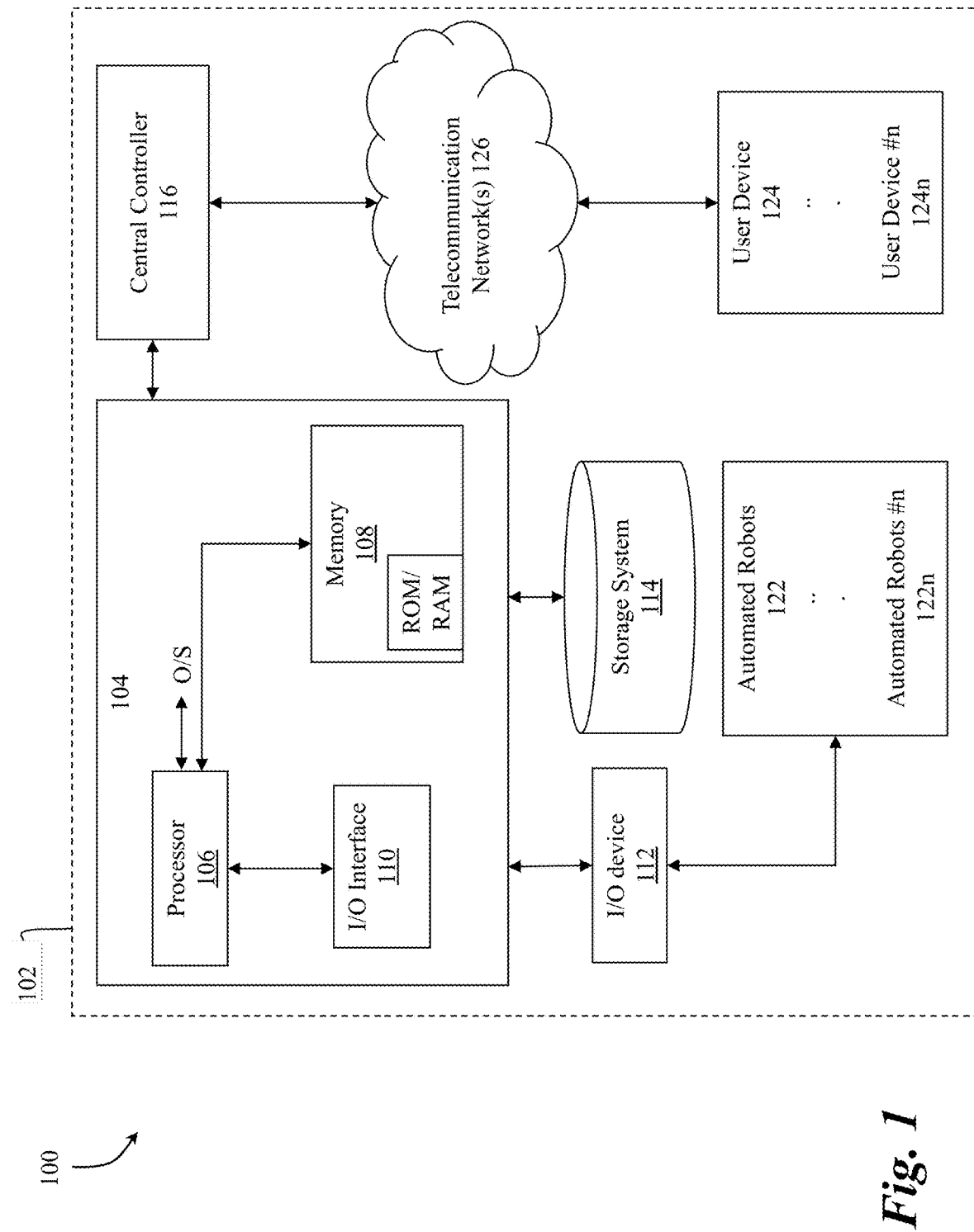
FIG. 1 is a diagrammatic illustration of an automated mobile robot storage and retrieval system.

An illustrative embodiment of the present invention relates to a system and method for managing inventory within an automated mobile robot storage and retrieval system. In particular, the present invention relates to a system and method for managing non-fungible inventory within the automated mobile robot storage and retrieval system that enables a customer to specify attributes of non-fungible goods, be presented with a specific non-fungible good for selection, select the specific non-fungible good and have the system automatically retrieve and deliver the non-fungible good in an order or delivery bundle. The non-fungible goods are picked within an automated fulfillment system through the utilization of a proxy picker. Initially, all non-fungible goods received into inventory of an automated store are captured and characterized through capturing images and obtaining data on attributes for each individual non-fungible good. After the data is ascertained for each individual non-fungible good, the goods are stored into specialized shaped sub-totes for storage in interchangeable totes and the totes are stored in storage racks of the automated fulfillment system. With the non-fungible goods stored in inventory and characterized in the database at an individual item level, customers can be provided with access to detailed information for each individual non-fungible good from a remote application or interface for selection as part of an order.

The customers can access the information for all non-fungible goods available in inventory from a graphical user interface provided within a virtual shopping terminal. Once within the graphical user interface of the shopping terminal, the customer can select a type of non-fungible good (e.g., apples, steaks, etc.) and then choose their attribute priorities (e.g., blemish density, firmness, color preference, shape preference, weight, etc.) to have those items best matching those attributes presented first. The customer may also have the option to place a weighting factor on each of the attributes, or alternatively create their own selection algorithm using the attribute data collected for the non-fungible good. Once the criteria are set and the type of non-fungible good is selected, the customer is able to, e.g., view a picture of non-fungible goods meeting their selected attribute priorities to select from, along with their respective attributes. Thereafter the customer selects one or more of the non-fungible goods to be added to their order for automated fulfillment. Once the selection is made, the system places the specific selected non-fungible goods into their virtual cart, the good is reserved for a predetermined period of time before being released back into the available inventory. Once the customer has completed and paid for an order, the details of the order is transmitted to the automated fulfillment section for fulfillment. Additionally, the store can determine how long the non-fungible items are presented to customers based on how long the attributes for the particular non-fungible item are expected to be representative of those of the actual good.

Instruction for picking the customer order is provided to a proxy picker at a picking workstation to carry out the fulfillment of customers order selections. Based on the received instructions, the proxy picker retrieves the designated non-fungible good from the one or more non-fungible goods based on the customer's selection and place the designated non-fungible good into an order tote of a delivery bundle. When the order is completed, the order totes are delivered to the customer.

FIGS. 1 through 8, wherein like parts are designated by like reference numerals throughout, illustrate an example embodiment or embodiments of an automated inventory management system implemented in an automated store and configured to manage non-fungible goods, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an illustrative automated inventory management system 100 implemented with a plurality of automated mobile robots 122. In particular, FIG. 1 depicts the inventory management system 100 configured to control the method of automated order fulfillment for non-fungible goods stored within the inventory management system 100. In particular, FIG. 1 depicts the automated inventory management system 100 configured to control the various modes of operation for each automated mobile robot of a plurality of mobile robots 122 (hereinafter, mobile robot(s)), automated decanting robots 262, proxy pickers 264, and other devices within the automated inventory management system 100. As utilized herein throughout, each of the plurality of mobile robots 122 are interchangeable with one another in that each mobile robot is capable of performing the full suite of operational modes and functions, such that if one mobile robot is insufficient to complete a task, any of the additional plurality of mobile robots 122 may be tasked with the operational mode to perform the desired task.

In accordance with an example embodiment of the present invention, the inventory management system 100 includes or is included within an automated mobile robot storage and retrieval system 102. The automated mobile robot storage and retrieval system 102 is a combination of physical structure (e.g., a storage facility), hardware, and software configured to carry out aspects of the present invention. In particular, the automated mobile robot storage and retrieval system 102 includes a computing system with specialized software, hardware, and databases designed for providing a method and system for managing inventory, including non-fungible inventory, within an automated inventory management system. For example, the automated mobile robot storage and retrieval system 102 can be software installed on a computing device 104, a web based application provided by a computing device 104 which is accessible by other computing devices (e.g., the user devices 124), a cloud based application accessible by computing devices, or the like. The combination of hardware and software that make up the automated mobile robot storage and retrieval system 102 are specifically configured to provide a technical solution to a particular problem utilizing an unconventional combination of steps/operations to carry out aspects of the present invention. In particular, the automated mobile robot storage and retrieval system 102 is designed to execute a unique combination of steps to provide a novel approach for manage non-fungible inventory within an automated inventory management system 100.

In accordance with an example embodiment of the present invention, the automated mobile robot storage and retrieval system 102 includes a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof, as would be appreciated by those of skill in the art. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can store data related to operation of the automated mobile robot storage and retrieval system 102. For example, the storage system 114 can store databases for inventory of goods, the mobile robots 122, and the various zones throughout the automated inventory management system 100. The storage system 114 can also include a database management system utilizing a given database model configured to interact with a user for analyzing the database data.

In accordance with an example embodiment of the present invention, the input and output devices 112 can include or otherwise be in communication with a combination of wireless transceivers. The wireless transceivers are configured to provide communication means between the automated mobile robot storage and retrieval system 102 and the plurality of mobile robots 122. Through the utilization of the wireless transceivers, the plurality of mobile robots 122 are tasked with operating various modes of operation within the automated inventory management system 100, as dictated by the automated mobile robot storage and retrieval system 102. As would be appreciated by one skilled in the art, the input and output devices 112 can include any combination of communication means known in the art for transmitting signals and data between the automated mobile robot storage and retrieval system 102 and the plurality of mobile robots 122. For example, the wireless transceivers utilized within the automated mobile robot storage and retrieval system 102 can include but is not limited to optical, near field or radio frequency identification, Wi-Fi, or Bluetooth wireless communication means to transmit signals and data to the plurality of mobile robots 122.

Continuing with FIG. 1, the automated mobile robot storage and retrieval system 102 can include a combination of core components to carry out the various functions of the present invention. In accordance with an example embodiment of the present invention, the automated mobile robot storage and retrieval system 102 can include a central control system (CCS) 116 configured to manage the operation of all the devices, mechanisms, and workers within the automated inventory management system 100 to provide picking of non-fungible goods for customers. In particular, the CCS 116 is configured to provide the mechanisms required to aggregate and provide available attribute data 216b of non-fungible goods in inventory to a customer, identify which specific non-fungible good(s) the customer has selected for an order, identify a location of the identified specific non-fungible good(s) within the automated inventory management system 100, task one or more of the mobile robots 122 to collect a product tote 232p containing the specific non-fungible good(s), and deliver product tote(s) 232p containing the specific non-fungible good(s) for proxy picking. As would be appreciated by one skilled in the art, the CCS 116 can include any combination of hardware and software configured to carry out the various aspects of the present invention.

In accordance with an example embodiment of the present invention, the automated inventory management system 100 can include a plurality of user devices 124 configured to communicate with the automated mobile robot storage and retrieval system 102 over a telecommunication network(s) 126. The automated mobile robot storage and retrieval system 102 can act as a centralized host, for the user devices 124, providing the functionality of the CCS 116 sharing a secured network connection. As would be appreciated by one skilled in the art, the plurality of user devices 124 can include any combination of computing devices, as described with respect to the automated mobile robot storage and retrieval system 102 and the computing device 104. For example, the computing device 104 and the plurality of user devices 124 can include any combination of servers, personal computers, laptops, tablets, smartphones, etc. In accordance with an example embodiment of the present invention, the computing devices 104, 124 are configured to establish a connection and communicate over telecommunication network(s) 126 to carry out aspects of the present invention. As would be appreciated by one skilled in the art, the telecommunication network(s) 126 can include any combination of known networks. For example, the telecommunication network(s) 126 may be combination of a mobile network, WAN, LAN, or other type of network. The telecommunication network(s) 126 can be used to exchange data between the computing devices 104, 124, exchange data with the storage system 114, and/or to collect data from additional sources.

Figure 2A:
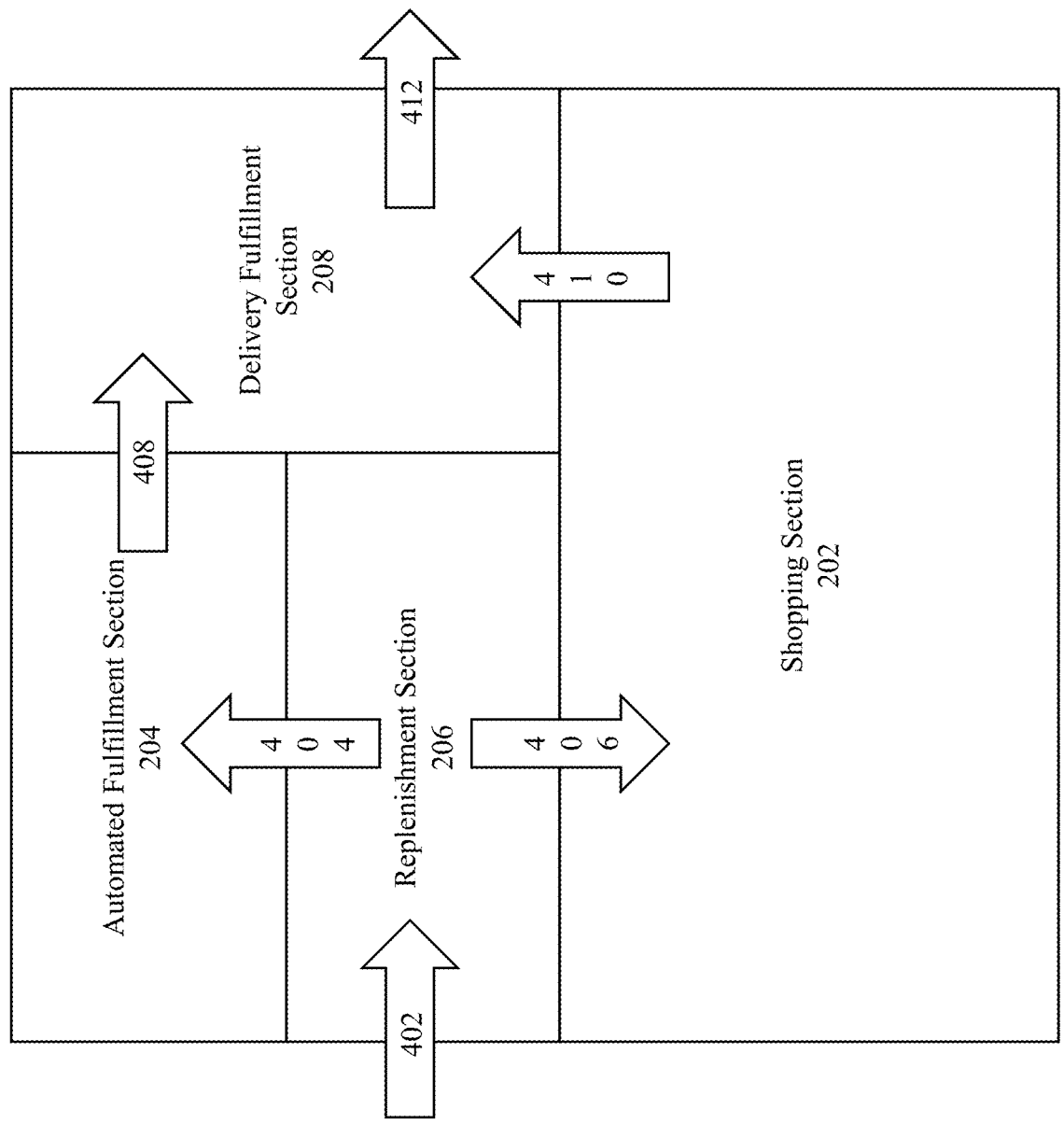
FIGS. 2A, 2B, 2C, 2D, and 2E are diagrammatic representations of an automated store layout implementing the automated mobile robot storage and retrieval system of FIG. 1.

FIG. 2A depicts a representative conceptual internal layout of an automated store 200 implementing the automated inventory management system 100 in accordance with the present invention. In particular, FIG. 2A depicts the automated store 200 including a shopping section 202, an automated fulfillment section 204, a replenishment section 206, a delivery fulfillment section 208, and how each of the areas of the automated store 200 conceptually relates to one another. As would be appreciated by one skilled in the art, the automated store 200 is not limited to the areas defined in FIG. 2A and multiple areas can be combined into a single area. For example, the automated fulfillment section 204 can include multiple areas or zones that include a storage section, the replenishment section 204, and the delivery fulfillment section 208 all in a single area. Additionally, although the different areas represented in FIG. 2A are represented within a single plane, the areas can be divided on multiple floors of an automated store 200. During operation of the automated store 200, all transactions occur through one or more of these areas 202, 204, 206, 208 and/or sub-areas of those areas.

Figure 2B:
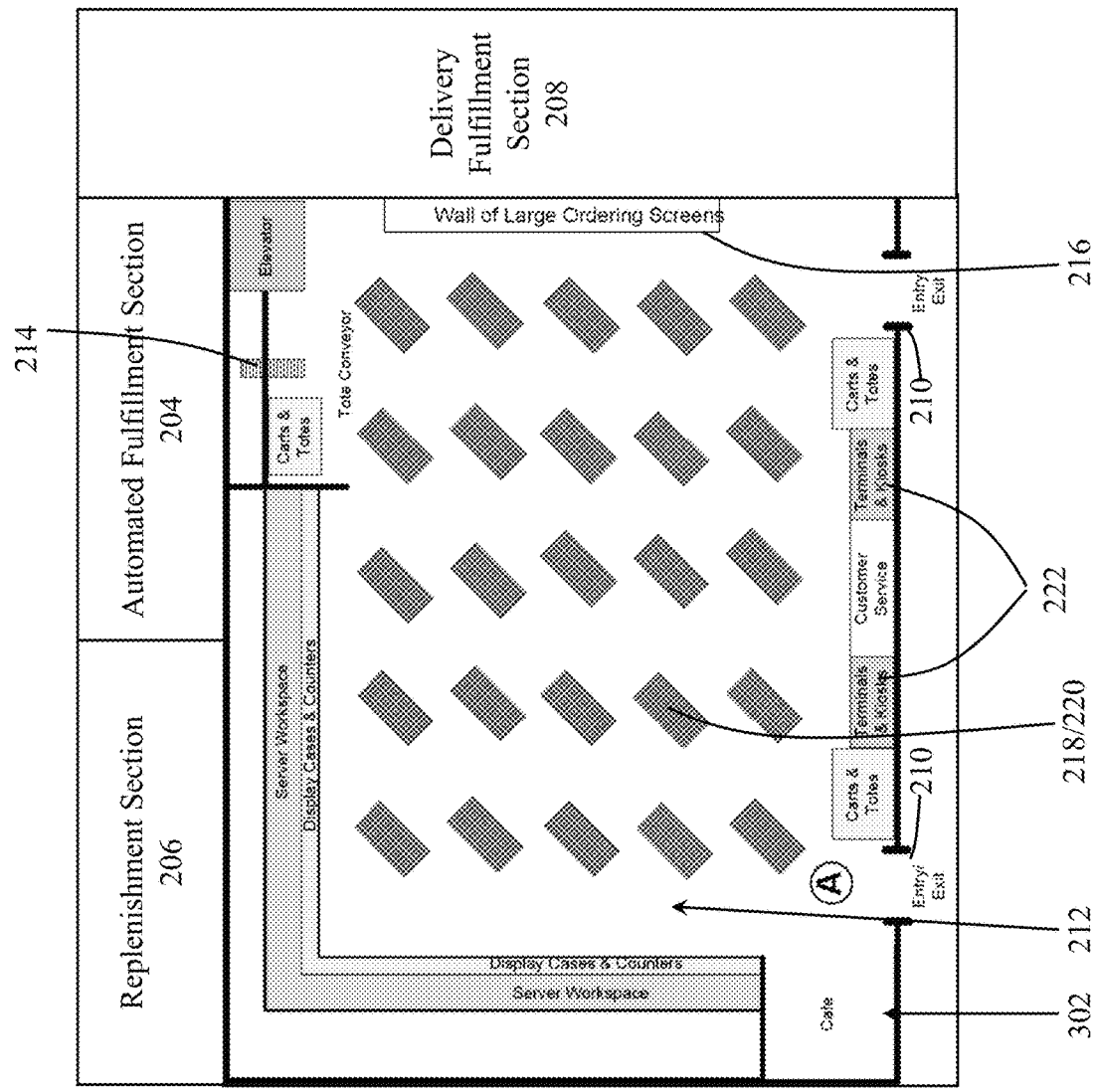

FIG. 2B depicts a diagrammatic illustration of the internal structure of the automated store 200, as discussed with respect to FIG. 2A. In particular, FIG. 2B depicts an exemplary view of the shopping section 202 and a conceptual relation of the shopping section 202 to the automated fulfillment section 204, the replenishment section 206, and the delivery fulfillment section 208. In accordance with an example embodiment of the present invention, the shopping section 202, as depicted in FIG. 2B, includes entry and exit points 210, a mock marketplace 212, and a pass through 214 to the automated fulfillment section 204. The mock marketplace 212 includes a combination of a wall of ordering screens 216, a plurality of physical shelving units 218, display cases of stands 220, and a plurality of shopping terminals and checkout kiosks 222. The shopping section 202 includes "non-fungible" goods such as produce, meat, seafood, cheeses (primarily random-weight), deli, floral, bakery, and prepared foods. Typically, non-fungible goods will be sold from display fixtures or cases 218 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences. The non-fungible goods will be configured in a manner in which specific eaches of the non-fungible gods can be picked by proxy pickers 264 based on a customer input (e.g., at the preview screens).

In accordance with an alternative embodiment of the present invention, the shopping section 202 includes entry and exit points 210 and a mock marketplace 212. The mock marketplace 212 includes a wall of ordering screens 216, display cases of stands 220, and a plurality of shopping terminals, and checkout kiosks 222. The display cases of stands 220 can include a combination of mock non-fungible goods and/or screens for selecting the non-fungible goods to be picked by proxy pickers 264. In the current embodiment, the non-fungible goods are stored in inventory within the automated fulfillment section 204 to be picked by proxy pickers 264 according to the customers selection made in the shopping section (e.g., at a shopping terminal, display case of stand 220, mobile app order, etc.).

Figure 3A:
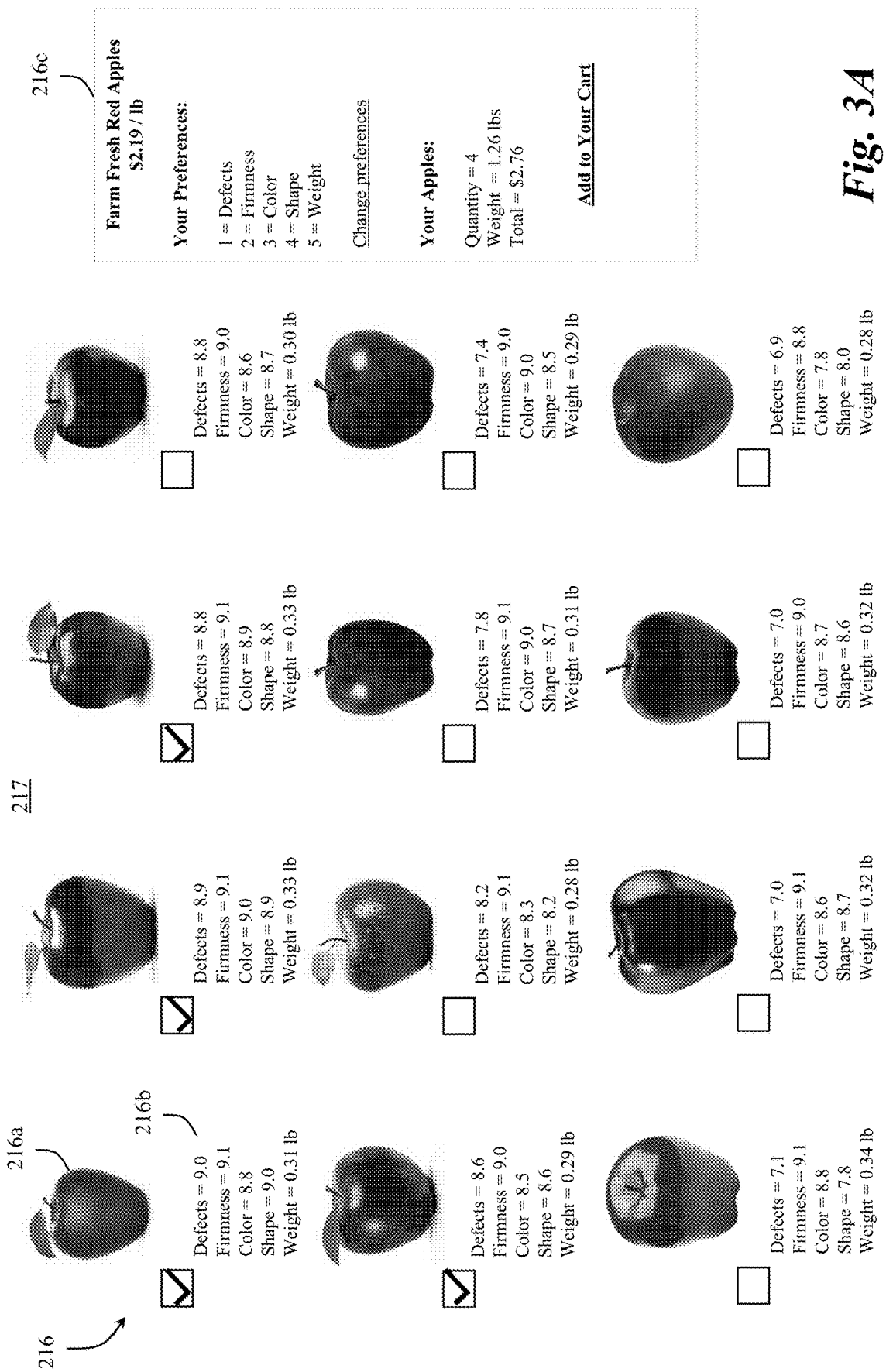

In accordance with an alternative embodiment of the present invention, the customer has multiple options to select their non-fungible goods themselves with the automated store 200 directly handling the non-fungible goods. In particular, the customers can select their non-fungible goods through a computer interface provided by an ordering screen 216 within the automated store 200 or outside the automated store 200 using, e.g., a mobile application or website. The selection of non-fungible goods by the user through the ordering screen 216 will be automatically fulfilled by the automated store 200 in the automated fulfillment system. FIGS. 3A and 3B depict example implementations of graphical interfaces presented on the ordering screens 216 provided within the shopping section 202, or anywhere via an application installed on a mobile or internet connected device. In particular, FIGS. 3A and 3B depict example ordering screens providing specific images 216a and attribute data 216b for non-fungible goods available for ordering through the automated fulfillment system 204. FIG. 3A depicts an example ordering screen 216 for selecting one or more apples for inclusion within the automated order fulfillment.

The graphical interface of FIG. 3A displays a plurality of images 216a of actual apples available in inventory and attribute data 216b associated with each of those actual apples. The images 216a and attribute data 216b act as selection criteria for a customer to select specific non-fungible goods within the store inventory (e.g., via a check mark) to be picked for their customer order. The graphical interface of FIG. 3A further includes an order table and order summary 216c. The order table and order summary 216c includes predefined and/or user selected criteria for the attribute data 216b as well as the current order status for any selected non-fungible goods. In the example display of FIG. 3A, five attributes 216b are defined as defects, firmness, color, shape, and weight. The attributes 216b are obtained by the system 100 when the inventory of non-fungible goods are received into the automated fulfillment system (e.g., through a specialized decanting process), as discussed in greater detail with respect to FIGS. 4A-4E. As would be appreciated by one skilled in the art, the attribute data 216b can include any combination of information measured, observed, or otherwise obtained about the particular class of non-fungible goods. Based on the type of non-fungible good, the ordering screens 216 display a different combination of attributes 216b. For example, the characteristics for apples will be different than for steaks, as represented in FIGS. 3A and 3B respectively. Continuing the example display of FIG. 3A, the order summary 216c includes a customer selection of four apples with a combined weight of 1.26 lbs and a cost of $2.76. As would be appreciated by one skilled in the art, the order summary can include any combination of information known in the art that would be useful to the customer.

In another example display, the graphical interface of FIG. 3B displays a similar type of information as discussed with respect to FIG. 3A, but with cuts of steaks instead of apples. The steaks are represented by a plurality of images 216a that are available in inventory and attribute data 216b associated with each of those steaks were obtained by the system 100 during decanting. The order table and order summary 216c of FIG. 3B includes five selection criteria attributes 216b defined as weight, marbling, color, firmness, and shape. The order summary 216c of FIG. 3B includes a customer selection of two steaks with a combined weight of 3.04 lbs and a cost of $30.34. As would be appreciated by one skilled in the art, the order summary can include any combination of information known in the art that would be useful to the customer. Once a customer has selected all of the desired non-fungible goods on the ordering screens 216, the order for the specifically selected non-fungible goods will be provided to the automated fulfillment section 204 for picking of those specific non-fungible goods, as discussed in greater detail with respect to FIGS. 5A-5D.

Continuing with FIG. 2B, regardless of the layout of the shopping section 202, the checkout kiosks 222 include payment transaction facilitator enabling the customer to render payment for goods. In accordance with an example operation, customers utilize the entrances 210 to enter and exit the shopping section 202 of the automated store 200.

Once inside the shopping section 202 of the automated store 200, customers can place orders for fungible goods and non-fungible goods, from the mock marketplace 212, to be fulfilled within the automated order fulfillment section 204, and delivered to the customer at the delivery fulfilment section 208.

Figure 2C:
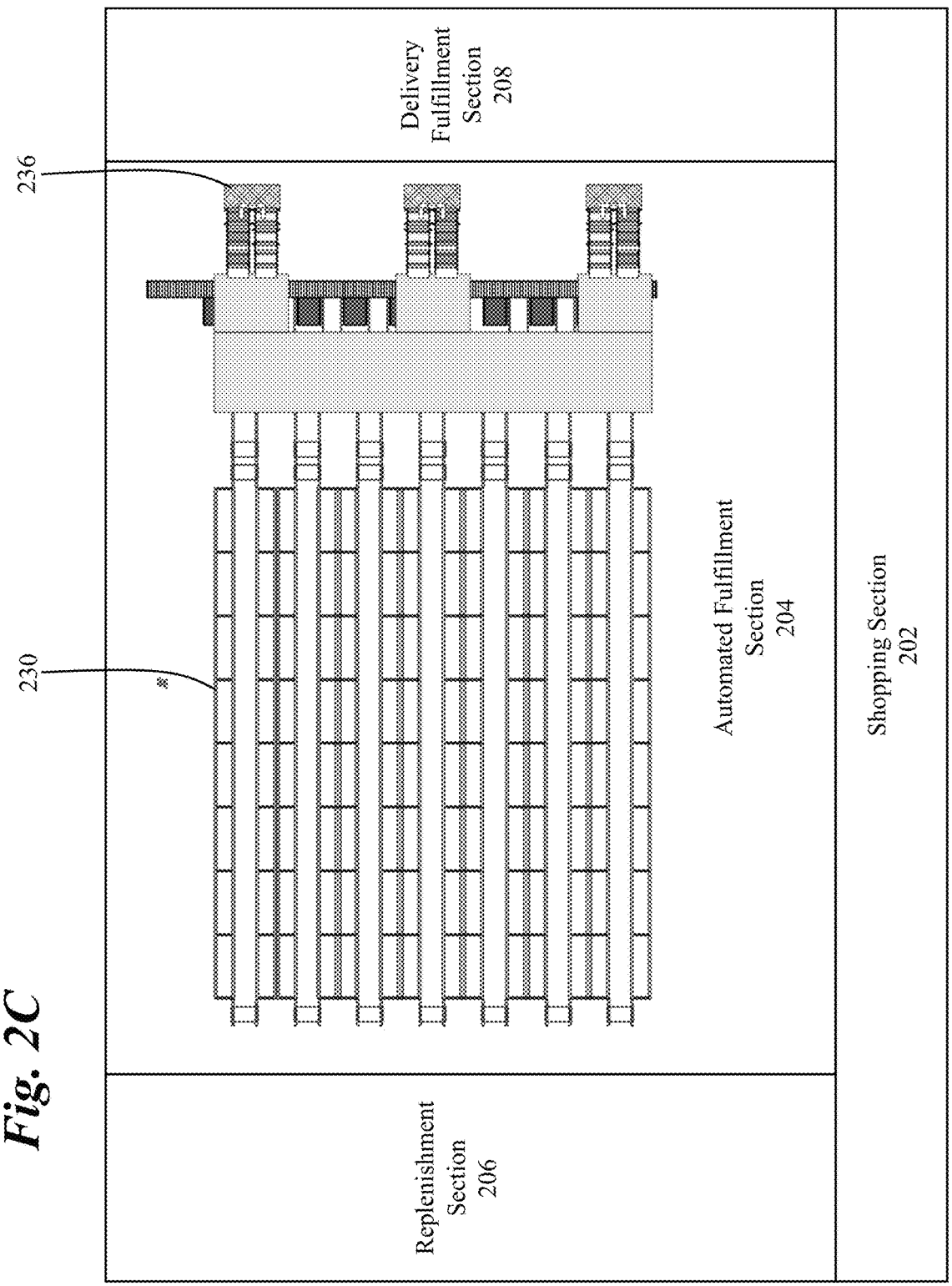

FIG. 2C depicts an exemplary view of the automated fulfillment section 204 and a conceptual relation of the automated fulfillment section 204 to the shopping section 202, the replenishment section 206, and the delivery fulfillment section 208. The automated fulfillment section 204 includes the storage rack 230 system configured to hold product totes 232p of inventory accessible by the mobile robots 122 and further configured to enable the mobile robots 122 to pull product totes 232p and deliver the product totes 232p to pickers 234 at picking workstations 236 for automated order fulfillment. In accordance with an example embodiment of the present invention, the picking workstations 236 are configured to retrieve or "pick" both fungible goods and non-fungible goods interchangeably. As would be appreciated by one skilled in the art, the picking workstations 236 include a combination of distinct fungible goods picking workstations 236a and non-fungible goods picking workstations 236b. For purposes of this disclosure, unless otherwise specified, picking workstations 236, fungible goods picking workstations 236a, and non-fungible goods picking workstations 236b are used interchangeably and are not intended to limit the present invention to either embodiment.

Additionally, the automated fulfillment section 206 includes a storage rack 230 including a plurality of rack modules separated by aisles and having a plurality of storage levels, the storage rack 230 structure storing a plurality of empty totes 232e that are empty, contain eaches, or contain orders. The storage rack 230 is configured to enable the mobile robots 122 to propel themselves horizontally and vertically throughout the storage rack 230 structure. The mobile robots 122 are configured to place empty totes 232e, product totes 232p, and order totes 232o into the storage rack 230 structure, remove empty totes 232e, product totes 232p, and order totes 232o from the storage rack 230 structure, and transport empty totes 232e, product totes 232p, and order totes 232o. Additionally, the mobile robots 122 are configured to deliver the empty totes 232e, product totes 232p, and order totes 232o to and from the picking workstations 236, 236a, 236b and other areas 202, 206, 208 of the automated store 200. An example of such a system is described in greater detail in U.S. Pat. No. 9,139,363, U.S. Patent Application Publication No. 2014/0288696, and U.S. patent application Ser. No. 15/171,802, all of which are incorporated by reference herein reference. During operation within the automated inventory management system 100, the mobile robots 122 traverse the different aisles and storage levels of the storage rack 230 structure to remove and replace the empty totes 232e, product totes 232p, and order totes 232o, as instructed from the automated inventory management system 100.

In accordance with an example embodiment of the present invention, customer orders for fungible and non-fungible goods are all fulfilled by an automated system within automated fulfillment section 204. In particular, customers utilize a graphical interface (e.g., see FIGS. 3A and 3B) to select which specific non-fungible good(s) they would like included within their order and the mobile robots 122 and proxy picker 264 retrieve (pick) that specific non-fungible good(s) for the customer order. When retrieval of the order of goods for automated fulfillment has been completed, the order totes 232o containing the fungible goods and non-fungible goods retrieved by the mobile robots 122 and proxy pickers 264 at the picking workstations 236 (or picked by pickers at fungible goods picking workstations 236a and non-fungible goods picked by proxy pickers 264 at non-fungible goods picking workstations 236b) will be provided to the delivery fulfillment section 208 (e.g., via path 408). Similarly, when customers have completed hand picking any goods provided within the shopping section 202, the customers will provide the goods to the delivery fulfillment section 208 (e.g., via path 410 and the pass through 214).

Figure 2D:
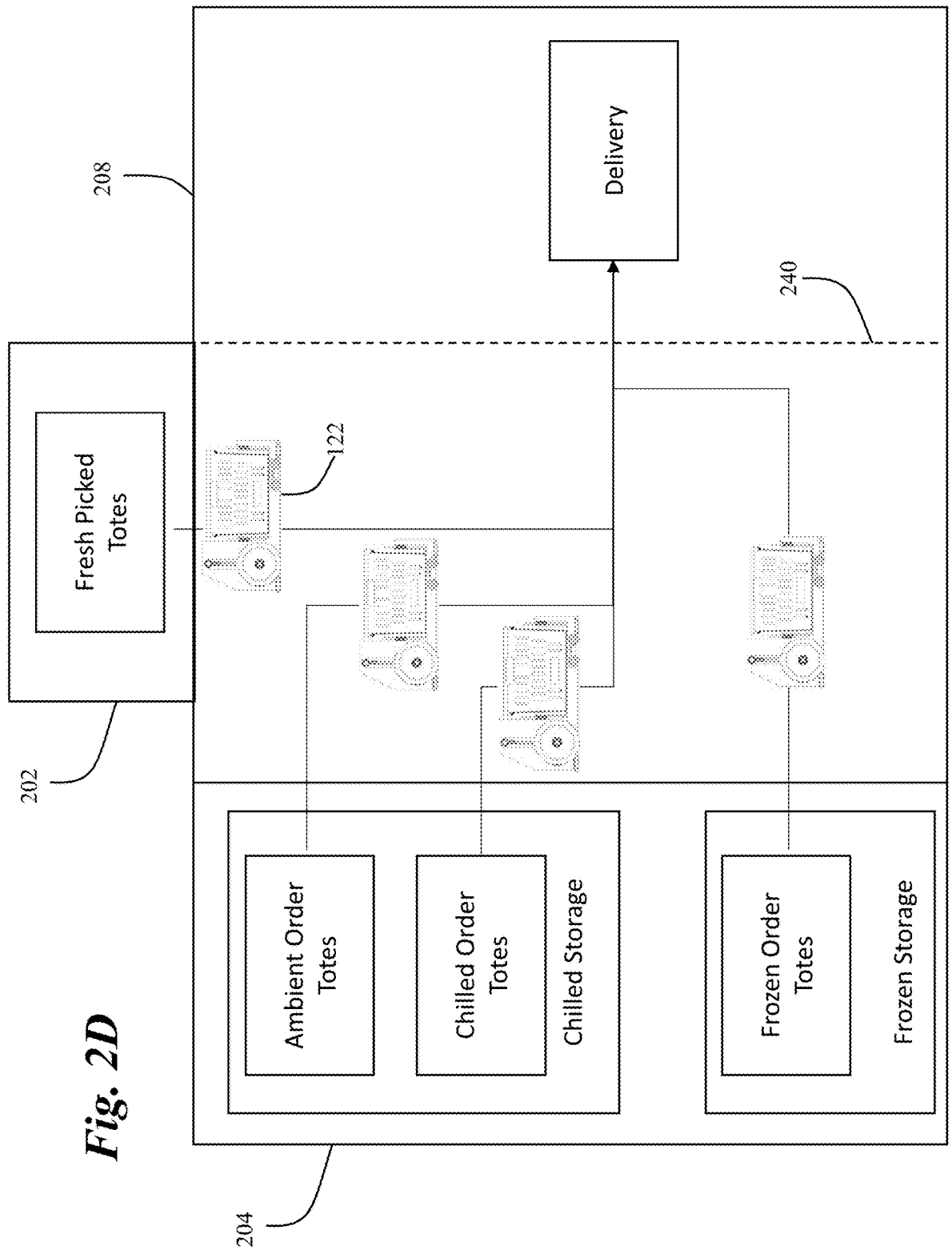

In accordance with an example embodiment of the present invention, the delivery fulfillment section 208 includes a consolidation section 240 in which goods from the automated fulfillment section 204 and goods from the shopping section 202 are combined and consolidated into order totes 232o for delivery to customers at one or more transfer stations 242, as depicted in FIG. 2D. At the consolidation section 240 of the delivery fulfillment section 208, the fungible and non-fungible goods provided from the automated fulfillment section 204 and any non-fungible provided from the shopping section 202 will be combined into a single order for delivery to the customer at a transfer station 242. In particular, the consolidation section 240 includes a merge module that combines eaches of goods picked from the automated fulfillment section 204 with eaches of goods picked from the shopping section 202 deposited at the one or more goods drop-off transfer stations 242. The combined eaches of goods from both sections 202, 204 form a delivery bundle (e.g., one or more order totes 232o of goods) and the mobile robots 122 transfer the completed delivery bundle to transfer station 242 which receives and stores a delivery bundle in a designated location until a customer arrives to take possession of the delivery bundle. Alternatively, the store may deliver the completed delivery bundle to the customer's home or other designated location via a store delivery service or a third party transportation service.

In accordance with an example embodiment of the present invention, during consolidation, a plurality of mobile robots 122 are tasked to retrieve order totes 232o of goods from the various sections 202, 204, and transfer those order totes 232o to the merge module of the consolidation section 240, as depicted in FIG. 2D. Based on the quantity of goods, one or more of the plurality of mobile robots 122 or one or more new mobile robot(s) 122 can retrieve the delivery bundle and transfer the bundle to the appropriate transfer station 242. Each of the tasks as it related to FIG. 2D is carried out within the delivery mode of operation with different task demands provided to each of the automated mobile robots 122 performing each specific task (e.g., delivering goods from the shopping section 202, delivering goods from the automated fulfillment section 204, delivering the completed delivery bundle to the transfer station 242, etc.). As would be appreciated by one skilled in the art, the consolidation can occur within the same physical space as the automated fulfillment section 204, the delivery fulfillment section 208, or in a separate physical space. Additionally, merging may not be necessary if an order of goods is already optimally included within one or more order totes 232o.

Figure 2E:
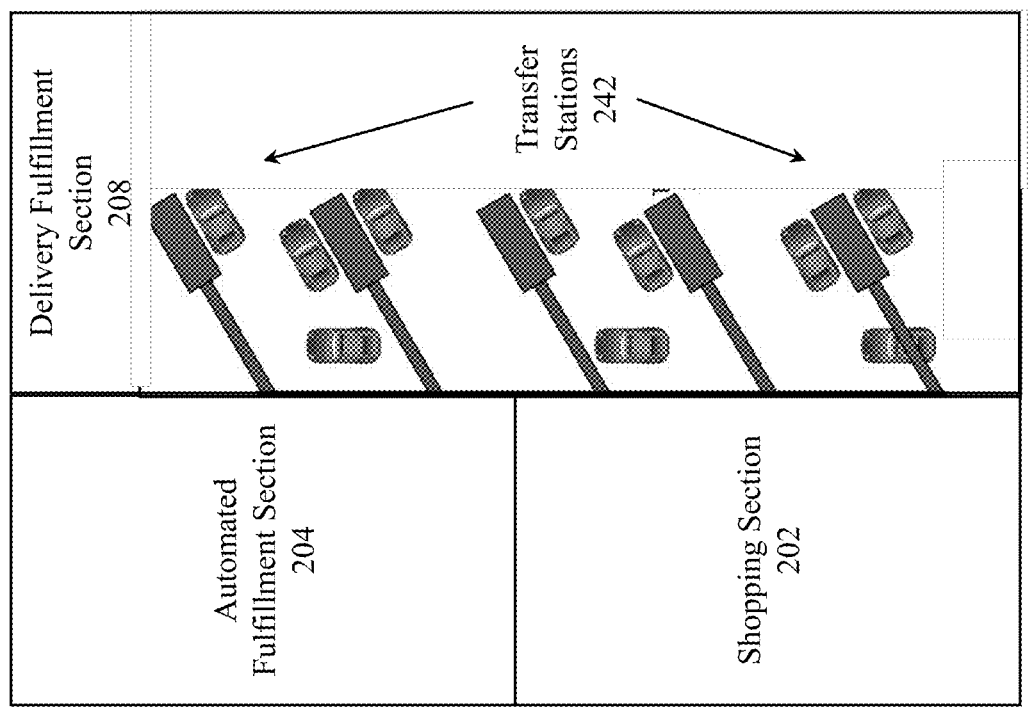
Figure 6A:
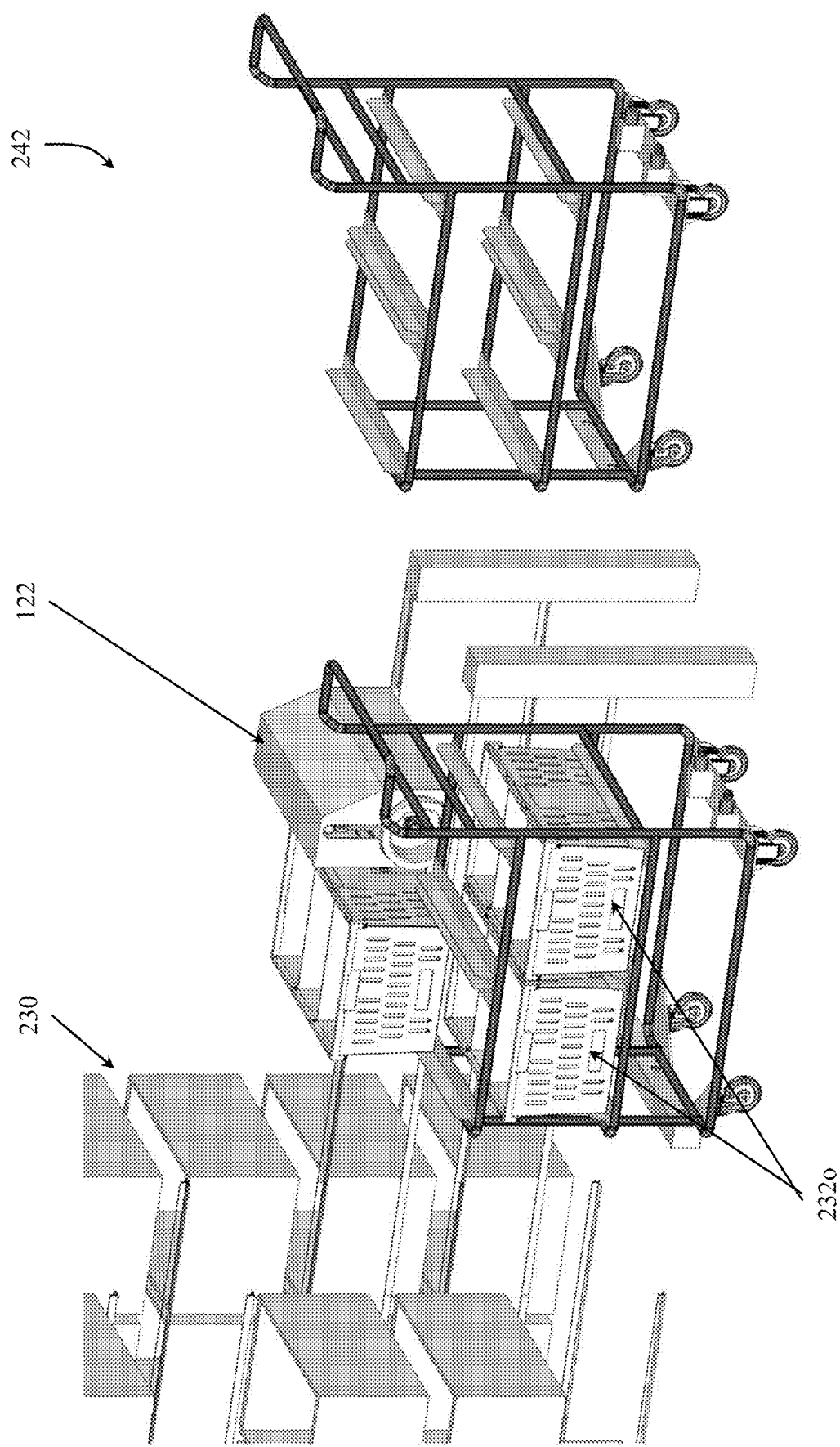
FIGS. 6A and 6B are illustrative depictions of transfer stations for use within an automated mobile robot storage and retrieval system.
Figure 6B:
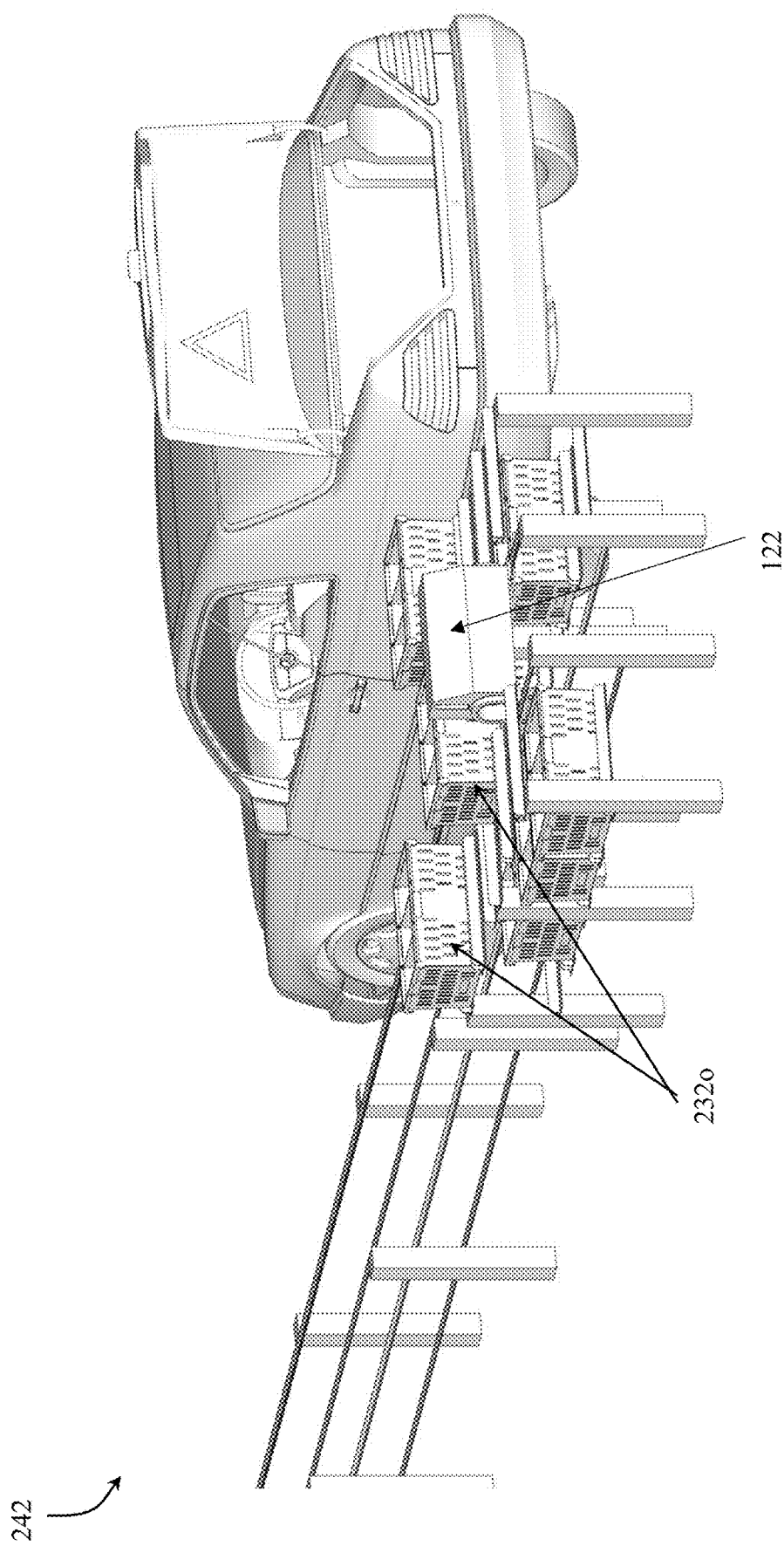

FIG. 2E depicts an exemplary view of the delivery fulfillment section 208 and a conceptual relation of the delivery fulfillment section 208 to the automated fulfillment section 204 and the shopping section 202. In accordance with an example embodiment of the present invention, the delivery fulfillment section 208 includes a plurality of transfer stations 242 configured for customers to pick-up their orders. The transfer stations 242 are configured for the delivery of the goods directly to a customer or customer vehicle in a variety of ways, as depicted in FIGS. 6A and 6B.

Continuing with FIG. 2A, multiple pathways that the plurality of mobile robots 122 are configured to traverse during different modes of operation are depicted. The pathways include receiving new inventory at the replenishment section 206 via path 402, transferring inventory to the automated fulfillment section 204 for storage via path 404, transferring inventory to the shopping section 202 for storage via path 406, providing inventory from the automated fulfillment section 204 to the delivery fulfillment section 208 for order fulfillment via path 408 (e.g., fungible goods), optionally receiving inventory from the shopping section 202 at the delivery fulfillment section 208 for order fulfillment via path 410 (e.g., non-fungible goods), and transporting fulfilled orders to a delivery destination via path 412 (e.g., customer vehicle, delivery vehicle, etc.). The delivery fulfillment section 208 may utilize a temporary storage space within the automated storage rack 230 until the completed order is ready to be delivered to the customer or delivery service.

At each of the pathways 402, 404, 406, 408, 410, 412 at least one mobile robot 122 handles at least a part, if not all, of the transition. For example, at path 402 the automated mobile robots 122 can handle inventory of goods once the goods have been unloaded from a truck, either manually or through an automated process (e.g., at a fungible decanting station 254 or a non-fungible decanting station 260). In another example, the mobile robots 122 can handle the inventory throughout the automated fulfillment section 204 as well as the transfer from the automated fulfillment section 204 to the delivery fulfillment section 208 at pathway 408. The responsibilities for each of the mobile robots 122 changes based on the area of the automated store 200 that the robots 122 are assigned as well as the task that they are assigned to perform within or between those areas. In accordance with an example embodiment of the present invention, the automated store 200 is constructed out such that each pathway between locations within the store 200 are accessible from at least two access points to prevent single points of failure within the system 100.

In operation, the mobile robots 122 are configured to assist and/or carry out various operations throughout the automated store 200. Each of the various operations is carried out by allocating (e.g., via the CCS 116) the mobile robots 122 in one or more modes of operation. The modes of operation include, but are not limited to, a replenishment mode, a defragmentation mode, an order fulfillment mode, and a delivery mode. The replenishment mode includes receiving eaches of goods and depositing the eaches of goods in designated product totes 232p and/or storage locations within the storage rack 230, the defragmentation mode includes organizing product totes 232p and empty tote 232e and consolidating sub-totes stored within product totes 232p, the order fulfillment mode includes retrieving order totes 232o from the storage rack 230 and delivering the order totes 232o to the delivery fulfillment section 208, and the delivery mode includes receiving delivery bundles and transporting the delivery bundles to designated locations at the pick-up transfer stations 242. In accordance with an example embodiment of the present invention, each of the different modes of operation is executed by an mobile robot 122 of the same design. In other words, a single automated mobile robot 122 is capable of carrying out the tasks required by each of the modes of operation without modification.

In accordance with an example embodiment of the present invention, the non-fungible goods are received into the automated fulfillments section 204 in a different manner than the fungible goods. Initially, all goods (e.g., fungible and non-fungible goods) are received from shipments at the replenishment section 206. Thereafter, the received goods are unboxed and decanted for integration within the automated fulfillment section 204. A detailed implementation for how shipments of fungible goods are received are received into the automated fulfillment section 204 is discussed in greater detail in U.S. Application No. 62/444,693, incorporated in its entirety herein by reference. The decanting process for non-fungible goods differs from fungible goods because fungible goods are intended to be uniform and interchangeable these goods can be received into the automated fulfillment section 204 without significant inspection (e.g., outside of obvious damage) or differentiation.

Figure 4A:
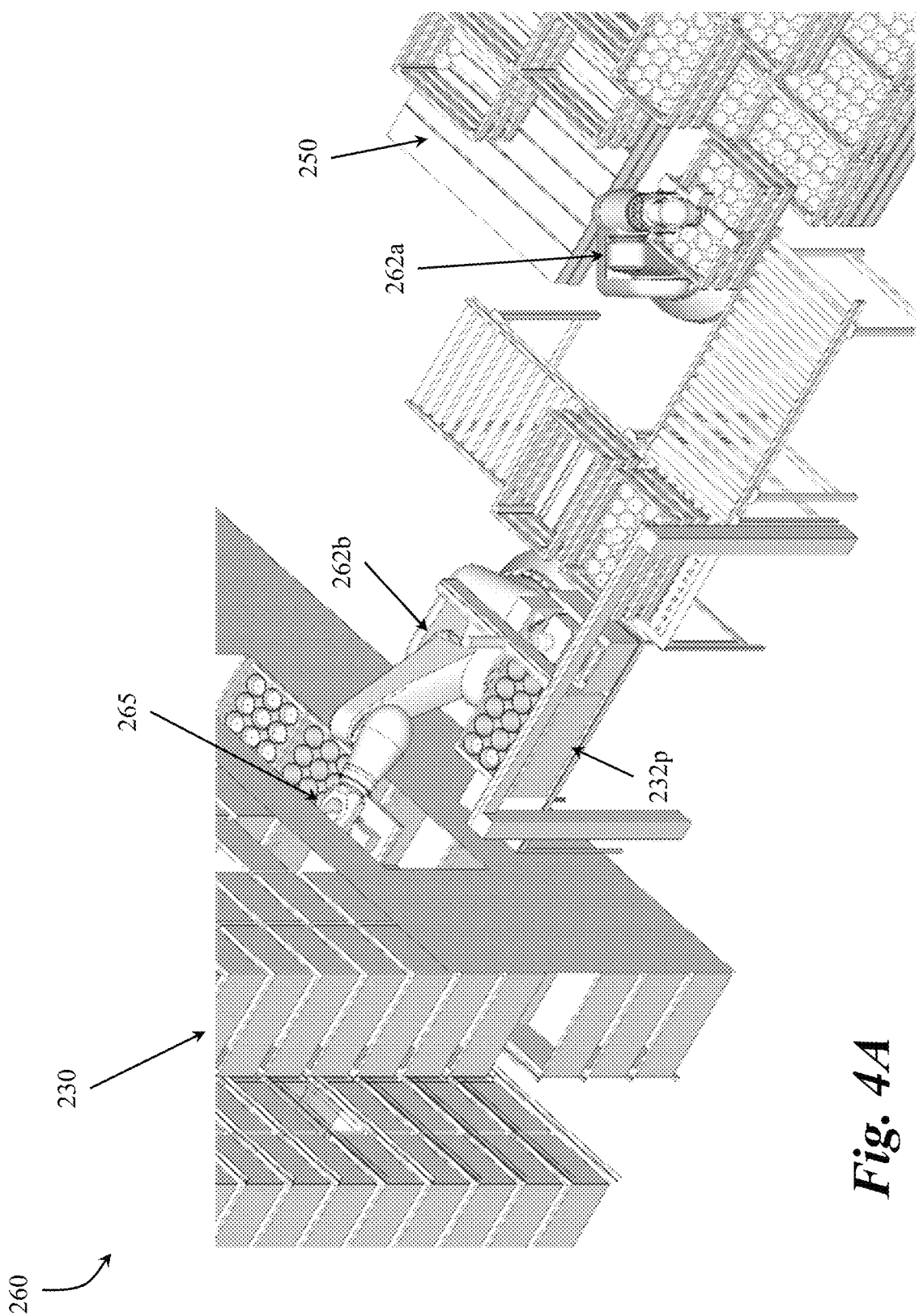
FIGS. 4A, 4B, 4C, 4D, and 4E are illustrative depictions of automated non-fungible goods decanting stations for use within the automated mobile robot storage and retrieval system.
Figure 4B:
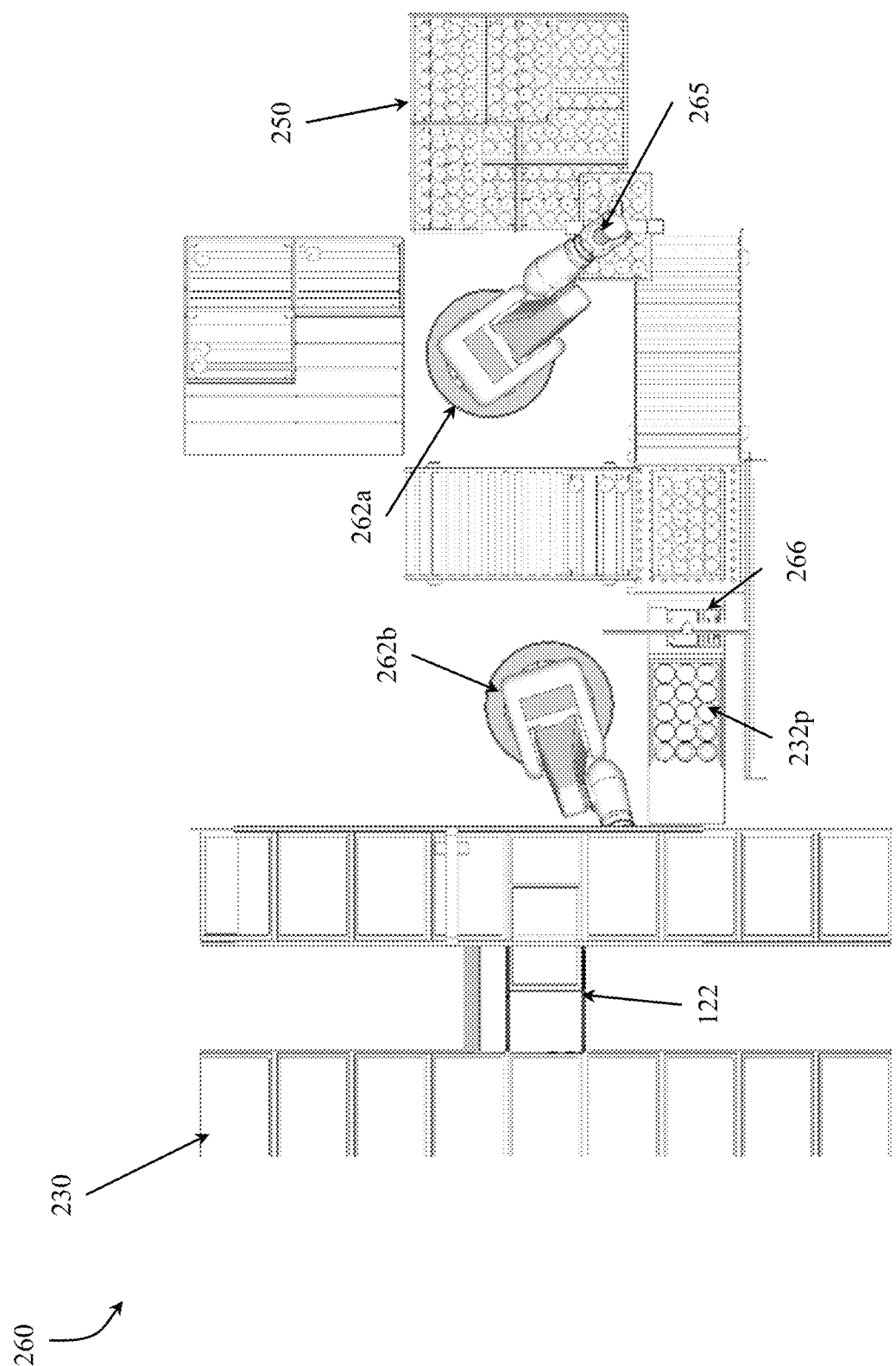
Figure 4C:
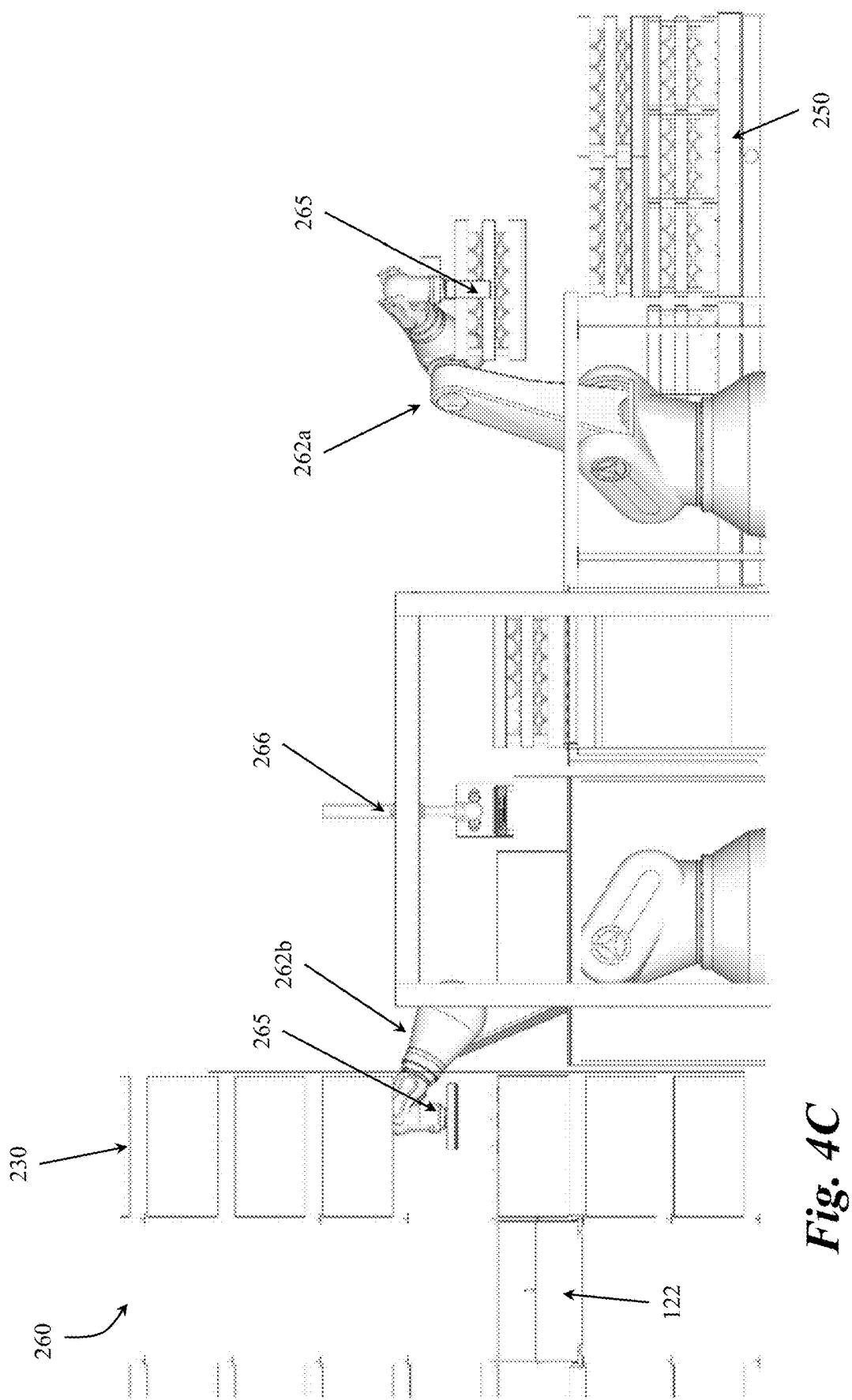
Figure 4D:
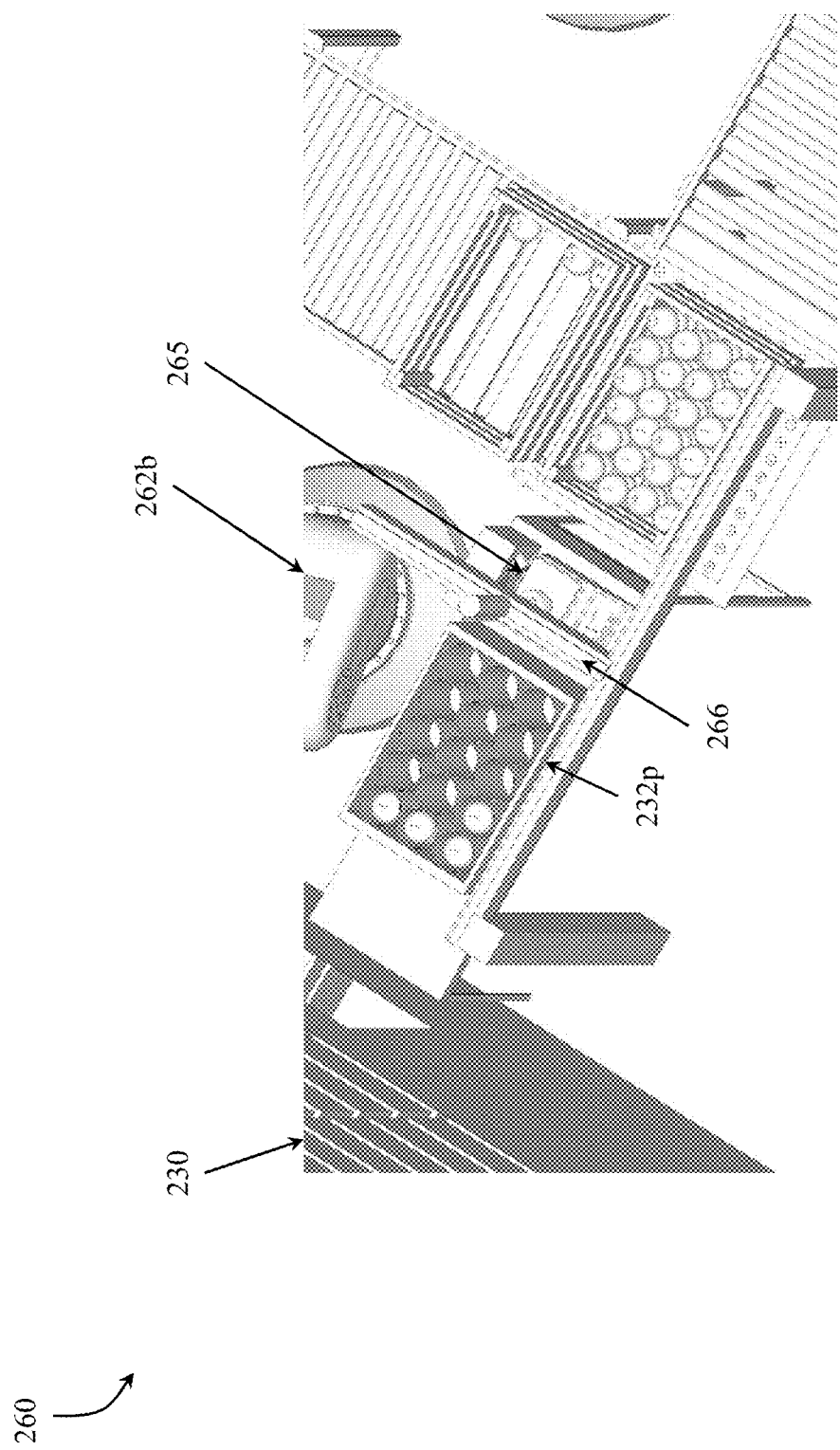
Figure 4E:
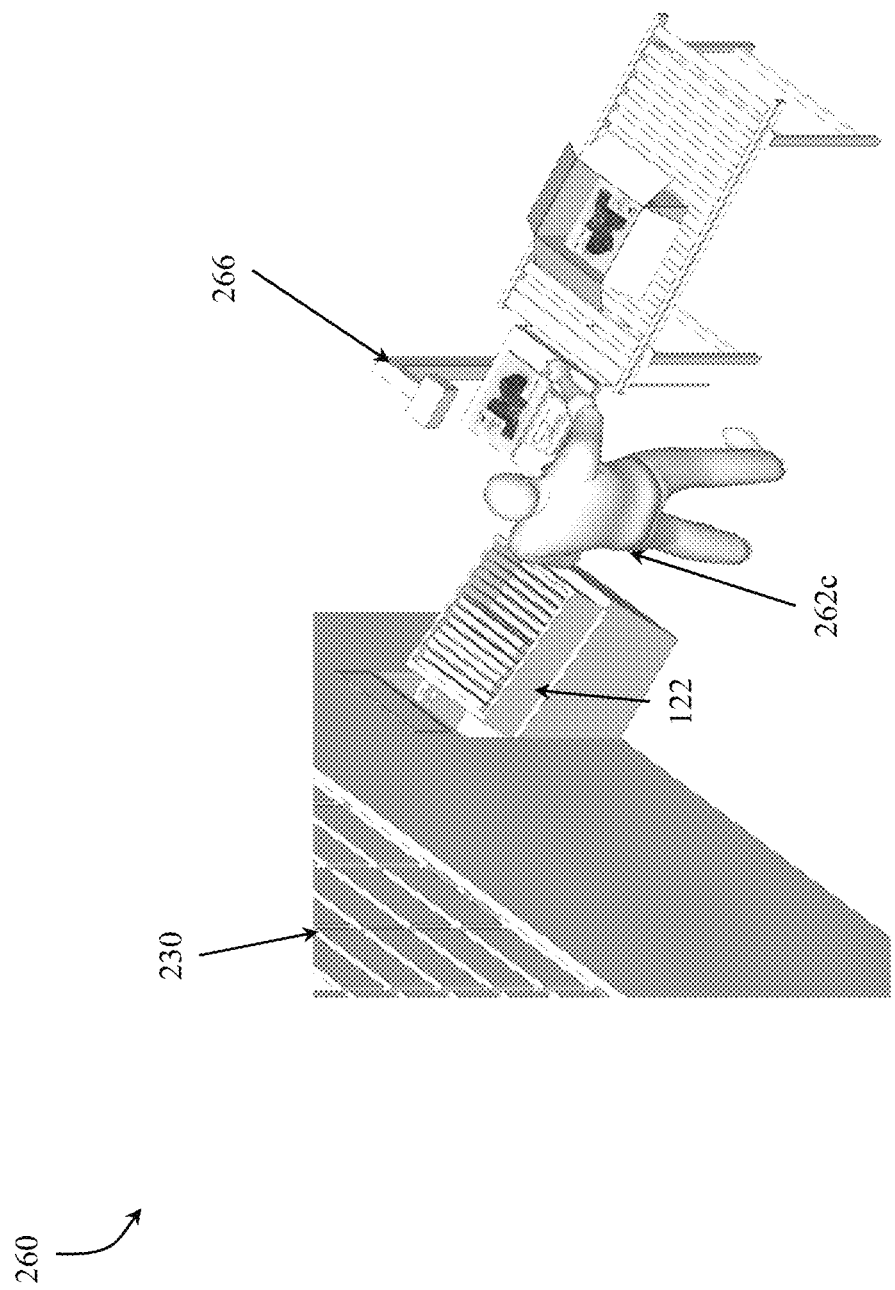

In contrast, non-fungible goods are received into the automated fulfillment section 204 utilizing a combination of specialized methods and systems. FIGS. 4A-4E depict different views of automated non-fungible decanting station 260. In particular, FIG. 4A depicts an exemplary embodiment of the automated non-fungible decanting station 260 including a first automated decanting robot 262a, a second automated decanting robot 262b, a data acquisition device 266, a pallet of cases 250 of goods, at least one product tote 232p, and the storage rack 230. Similarly, FIGS. 4B and 4C depict the same automated non-fungible decanting station 260 from an above view perspective and a side view perspective, respectively. FIG. 4D also depicts the same automated non-fungible decanting station 260 with a focus on the second automated decanting robot 262b, the data acquisition device 266, and the at least one product tote 232p. As would be appreciated by one skilled in the art, one or more of the automated decanting robots 262 can be replaced with a human operator, as depicted in FIG. 4E.

In accordance with an example embodiment of the present invention, all non-fungible goods are received into the automated fulfillments section 204 through an automated non-fungible decanting station 260 within the replenishment section 206. The automated non-fungible decanting stations 260 are configured to replenish non-fungible goods received from manufacturers, suppliers, and returns from customers to the automated fulfillment section 204, as depicted in FIGS. 4A-4E. In particular, the decanting process includes transferring products from pallet(s) of cases 250 and/or customer returns into product totes 232p to be stored within the storage rack 230 of the automated fulfillment section 204 for retrieval by mobile robots 122. Additionally, as would be appreciated by one skilled in the art, the automated store 200 can designate that some of the non-fungible goods be delivered to the shopping section 202 directly for direct shopper selection, while other non-fungible goods are stored in the automated section 204 for selection via computer user interface as discussed in greater detail herein. In accordance with an example embodiment of the present invention, the automated non-fungible decanting stations 260 include one or more automated decanting robots 262 configured to unload the non-fungible goods, characterize/obtain attribute data 216b for the non-fungible goods, and store the non-fungible goods in one or more specialized sub-totes for storage in the product totes 232p.

During operation, when pallet(s) of cases 250 (or customer returns) are delivered to the automated non-fungible decanting station 260, as depicted in FIGS. 4A-4E, the automated decanting robots 262 will remove eaches of items from the cases of goods on the pallets 250, as instructed by the system 100, and insert the eaches into a combination of specialized sub-totes stored within interchangeable product totes 232p or empty totes 232e, after their attribute data has been collected. In accordance with an example embodiment of the present invention, the sub-totes for non-fungible goods are specialized in size, dimension, and configuration to store non-uniform sized and dimensioned non-fungible goods (e.g., produce, meat, etc.) while still fitting into the interchangeable sized and configured product totes 232p or empty totes 232e. In particular, each type or class of non-fungible good will be associated with a particular standardized sub-tote or specialized sub-tote configured to store the non-fungible good. For example, each non-fungible good can be associated with a specialized sub-tote shaped and dimension as one of a grid compartment, slots, or a tube shape. Additionally, the specialized sub-totes can be sized to fit any quantity of non-fungible good in a manner in which the automated inventory management system 100 can discern where in the specialized sub-tote a particular non-fungible good is located. For example, a slot shaped sub-tote may be configured to hold a single steak whereas a tube may be configured to hold a plurality of apples stacked on top of one another in single file order. As would be appreciated by one skilled in the art, any shaped and sized sub-tote configured to fill an inner volume of the product totes 232p or empty totes 232e can be utilized without departing from the scope of the present invention. Additionally, the specialized sub-totes of the same shape can be stored within a single product tote 232p or empty tote 232e, mixed up with other specialized sub-tote shapes within a single product tote 232p or empty tote 232e, and/or mixed up with standardized sized sub-totes within a single product tote 232p or empty tote 232e. Similarly, a product tote 232p can include any combination of sub-totes including non-fungible goods only, fungible goods only, and/or a mixture of sub-totes containing non-fungible goods and other sub-totes containing fungible goods.

The automated decanting robots 262 will continue to fill eaches of goods into the designated sub-totes stored within the product totes 232p (or empty tote 232e) until each product tote 232p reaches capacity (e.g., filled with a maximum number of sub-totes) or the pallets of cases 250 are empty. Additionally, as non-fungible goods are placed into the sub-totes, each non-fungible good is associated with an identifier and a location within a sub-tote. In the case of items stored in tube shaped sub-totes, the non-fungible goods are sorted at the non-fungible decanting station 260 and one tube shaped sub-tote is left empty to facilitate sorting to access the customer selected good. During the sorting process, the CCS maintains and stores the location of all non-fungible goods contained within the product totes 232p. As would be appreciated by one skilled in the art, each pallet of cases 250 can vary in dimensions and quantity of cases (and eaches of goods contained therein). For example, standard pallets can include, but are not limited to, a North American pallet, a European pallet, an Australian pallet, or an Asian pallet, with each standard being configured to hold a different quantity of cases. Additionally, in accordance with an example embodiment of the present invention, the product totes 232p, order totes 232o, or empty totes 232e are sized, dimensioned, and configured to fit on a standard pallet to act as the cases of goods. For example, a North American pallet is dimensioned approximately at 1.2 m by 1.2 m and the product totes 232p, order totes 232o, or empty totes 232e can by dimensioned at 600 mm by 400 mm by 300 mm to fit on the 1.2 m by 1.2 m pallets.

In accordance with an example embodiment of the present invention, only goods of the same lot and expiration are stored together within a sub-tote, fungible or non-fungible. Goods with the same lot or expiration are grouped together to ensure the goods are efficiently managed, and provide the store with the ability to remove expired, spoiled and/or recalled products accurately and quickly with minimal effort. Expiration traceability also allows promotion of near-expiration goods In accordance with an example embodiment of the present invention, empty specialized sub-totes are includes within a product tote 232p stored filled specialized sub-totes of the same shape. The empty specialized sub-totes are provided to enable a proxy picker 264 with the ability to sort through non-fungible goods to a particular non-fungible good selected for a customer order. For example, for a stack of apples stored in a tube shaped sub-tote, the empty sub-tote provides the proxy picker 264 with a "buffer" sub-tote for holding apples as they are removed from a target tube sub-tote to reach a target apple. Continuing the example, if there are five apples in a tube shaped sub-tote, stacked in single file, and the target apple is in the middle of the tube, the proxy picker 264 can remove the top two apples and place them in the empty tube sub-tote contained within the product tote 232p for temporary storage, and then remove the target apple in the middle of sub-tote. Once the target apple is removed, the temporarily removed apples can be returned to the original target sub-tote, thus leaving the empty "buffer" sub-tote empty again. As would be appreciated by one skilled in the art, the system 102 can elect to keep the buffered non-fungible good in the sub-tote and update and store the location for that non-fungible good within that sub-tote. Additionally, throughout this process the automated inventory management system 100 is tracking the location and positioning within respective sub-totes of each non-fungible good. As would be appreciated by one skilled in the art, this same concept could be extended to other non-fungible items (e.g., steaks picked from meat lugs, weighed, photographed, tested for firmness, etc.) stored within different shaped sub-totes and is not limited to apples in a tube shaped sub-tote.

In accordance with an example embodiment of the present invention, during the decanting process, the automated decanting robots 262 are configured to enable the system 100 to capture image(s) 216a and obtain and/or derive attribute data 216b for each individual non-fungible good. In an example embodiment, the automated decanting robots 262 are configured with a plurality of sensors and data capture devices configured to capture one or more images 216a and capture and/or derive attribute data 216b for each non-fungible good prior to being placed within a sub-tote. The ascertained images 216a and attribute data 216b is subsequently stored in a non-fungible item database (e.g., storage system 114) for usage by the system 100. An example of the type of attribute data 216 is represented in Table 1 below. Additionally, a more detailed table is proved in Appendix A.

TABLE 1

| Food | Non-fungible | Future Non-fungible | Fungible | Tote Storage Method | Attribute 1 | Attribute 2 | Attribute 3 | Attribute 4 |
|---|---|---|---|---|---|---|---|---|
| Bread | | X | | Subtote | | | | |
| Deli Meat | | | X | Subtote | Weight | | | |
| Cheese | | | X | Subtote | Weight | | | |
| Apples | X | | | Tube | Defects | Shape | Color | Weight |
| Bananas | X | | | Subtote | Defects | Shape | Color | Weight |
| Berries | | X | | Subtote | Weight | | | |
| Grapes | | X | | Subtote | Weight | | | |
| Tomatoes | X | | | Tube | Defects | Shape | Color | Weight |
| Pears | X | | | Tube | Defects | Shape | Color | Weight |

Table 1 depicts a list of goods including bread, deli meat, cheese, apples, bananas, berries, grapes, tomatoes, and pear with classifications of non-fungible, future non-fungible, and fungible, a tote storage method, and a number of attributes (e.g., attributes 1-4). The attributes in Table 1 include attributes related to weight, defects, shape, and color. As would be appreciated by on skilled in the art, the system 102 can include tables of information for any number of goods and attributes, and is not limited to the information provide in Table 1. Using the information obtained and stored in Table 1, the system 102 can determine which goods have which attributes. For example, apples are classified as non-fungible goods, are stored in a sub-tote and have attributes related to defects, shape, color, and weight.

In an alternative example embodiment, the automated decanting robots 262 are configured to place each non-fungible good within a data acquisition device 266 which is configured with a plurality of sensors and data capture devices configured to capture one or more images 216a and capture and/or derive the attribute data 216b for each non-fungible good. The data acquisition device 266 automatically captures all ascertainable attribute data 216b of the non-fungible goods and records the ascertainable attribute data 216b in the non-fungible item database (e.g., storage system 114). In this example, when all of the desired data is ascertained, the automated decanting robot 262 will remove the non-fungible good from the data acquisition device 266 and place the good into a product tote 232p or empty tote 232e.

Regardless of which example embodiment is implemented, the plurality of sensors and data capture devices can include, but are not limited to an optical sensor device (e.g., digital camera, optical spectrometer, etc.) oriented at and receiving optical data, a weight sensor device receiving weight data, a touch sensor device receiving firmness data, a chemical sensor device receiving odor or gas emission data. As would be appreciated by one skilled in the art, any combination of sensors and devices can be utilized to capture images 216a and attribute data 216b for the non-fungible goods. Based on the data obtained by the plurality of sensors and data capture devices, the attribute data 216b for each non-fungible good can be ascertained and stored in a database. Examples of the attribute data 216b obtained or derived from the plurality of sensors and data capture devices includes, but are not limited to, defects, color, size, firmness, weight, shape, etc.

In accordance with an example embodiment of the present invention, each attribute of the ascertained attribute data 216b associated with each individual non-fungible good that it was obtained from and stored in the non-fungible item database. Within the database, each individual non-fungible good is associated with a unique identifier. Additionally, the automated inventory management system 100 stores a location in which each non-fungible good is stored within the automated store 200. The location can include a specific product tote 232p location within the storage rack 230, a specific sub-tote stored within the specific product tote 232p at the product tote 232p location, and/or a position that the non-fungible good is stored within the sub-tote (e.g., third each within a stack of eaches within the sub-tote). As a result, the automated inventory management system 100 is enabled to track the precise location and the positioning for each individual non-fungible good. For example, the automated inventory management system 100 knowns which slot sub-tote stores specific steak, which position for apple in a tube sub-tote (e.g., one apple down in tube for example). The combination of the unique identifier and location information, the system 100 is able to track exactly where each non-fungible good associated a particular set of images 216a and attribute data 216b is located, thus enabling efficient retrieval of that non-fungible good for a customer order.

Once the non-fungible goods are virtually characterized within the database and physically stored within the specialized sub-totes, the non-fungible goods are stored, tracked, and managed in the same manner as the product totes 232p of fungible goods. Only upon retrieval for picking at the non-fungible goods picking workstations 236b is the handling of the product totes 232p of non-fungible goods within the automated fulfillment section 204 different. Specifically, when a customer order calls for retrieval of a product tote 232p for picking a non-fungible good, an mobile robot 122 will be tasked with retrieving the product tote 232p and delivering the product tote 232p to a picking workstation 236 (or a designated non-fungible goods picking workstation 236b) for picking by a proxy picker 264, as discussed in greater detail with respect to FIGS. 5A-5D. As would be appreciated by one skilled in the art, based on the type of goods being picked, the proxy picker 264 will be provided with different instructions for which good to pick based on a customer selection. For example, in the case of fungible goods, a sub-tote is illuminated and in the case of non-fungible goods, the location of the sleeted good within a sub-tote is illuminated. For example, if retrieving an apple from within a tube shaped sub-tote, the system 102 will illuminate a light in a direction to instruct a proxy picker 264 (e.g., human picker) to sort the apples between the tube shaped sub-tote, and then transfer the customer selected apple from the tube shaped sub-tote to an order tote 232o.

In accordance with an example embodiment of the present invention, the product totes 232p, order totes 232o, or empty totes 232e (collectively, totes 232) are interchangeable and are designated with different identifiers for use by the mobile robots 122 and the system 100. That is, while the product totes 232p, order totes 232o, or empty totes 232e are the same structurally such that they are interchangeable in the tasks that the totes 232 can be utilized for based on the designation associated therewith. The product totes 232p, order totes 232o, or empty totes 232e are designated herein with custom reference numbers and modifiers based on their capacity as well as the mode of operation in which they are being utilized. In particular, the interchangeable product totes 232p, order totes 232o, or empty totes 232e (i.e., all totes 232) are designated as empty totes 232e when empty (e.g., no items included therein), designated as product totes 232p when containing eaches of goods (e.g., inventory), designated as order totes 232o when containing eaches of goods for customer orders, or combinations thereof. For example, when a product tote 232p has reached capacity (e.g., filled with sub-totes containing eaches of goods) at the automated non-fungible decanting station 260, a mobile robot 122 will receive a task demand to traverse to the automated non-fungible decanting station 260 and pick-up the product tote 232p and transport that product tote 232p to a designated storage location within the storage rack 230 for later retrieval (e.g., to fill an order). In operation, the automated inventory management system 100 provides the designations and the designations assist the automated mobile robots 122 to identify which product totes 232p, order totes 232o, or empty totes 232e are to be utilized for which mode of operation. For example, if a mobile robot 122 is instructed to retrieve and empty tote 232e as part of a mode of operation, the automated mobile robot 122 will know or be instructed to the location of an empty tote 232e.

In accordance with an example embodiment of the present invention, the CCS 116 can identify and track the locations of all the mobile robots 122, the product totes 232p, order totes 232o, or empty totes 232e (collectively, all totes 232), eaches within each sub-totes contained within each product tote 232p and order tote 232o, and the respective designations (e.g., modes or operation of the mobile robots 122 or tote designation) within the automated inventory management system 100. Additionally, the controller 116 can identify and track the locations if specific eaches of non-fungible goods within each sub-tote. For example, if six applies are stacked within a tube shaped sub-tote stored in a product tote 232p including eight tubes of apples, the controller 116 can track and identify the location of each specific apple within each sub-tote tube within each product tote 232p. The identification of the locations for all of the mobile robots 122 and totes 232 can further be utilized by the CCS 116 when allocating mobile robots 122 to different modes of operations. In particular, the CCS 116 can identify all of the mobile robots 122 that are located within a particular section and instruct those mobile robots 122 to perform a particular mode of operation within that section. The CCS 116 attempts to level-load the mobile robots 122 to ensure all necessary store 200 operations are completed with the fewest number of mobile robots 122.

In accordance with an example embodiment of the present invention, when a customer order for non-fungible goods is received by the system 100 (e.g., including selections of specific non-fungible goods from a shopping terminal screen 216), the CCS 116 can task one or more of the mobile robots 122 to retrieve one or more product totes 232p including the non-fungible goods and deliver those product totes 232p to a non-fungible goods picking workstation 236b. FIGS. 5A-5D depict example implementations for picking workstations 236 which can be specialized for picking non-fungible goods as non-fungible goods picking workstations 236b. In particular, the non-fungible goods picking workstation 236b include at least a reception point for mobile robots 122 for receiving and presenting mobile robots 122 during picking of eaches from the product totes 232p carried by the mobile robots 122.

In accordance with an example embodiment of the present invention, the non-fungible goods picking workstations 236b include a plurality of entry points (e.g., from a transit deck) for one or more automated mobile robots to deliver product totes 232p of non-fungible goods to be picked for a customer order. In accordance with an example embodiment of the present invention, the non-fungible goods picking workstations 236b includes at least two entry points such that one or more automated mobile robots delivering product totes 232p from the storage rack 230 to the non-fungible goods picking workstations 236b can be queued in an optimal order of delivery for a proxy picker 264. The non-fungible goods picking workstations 236b include at least one exit point for the mobile robots 122 to exit the workstation after the non-fungible good(s) have been picked from the delivered product tote 232p.

Figure 5A:
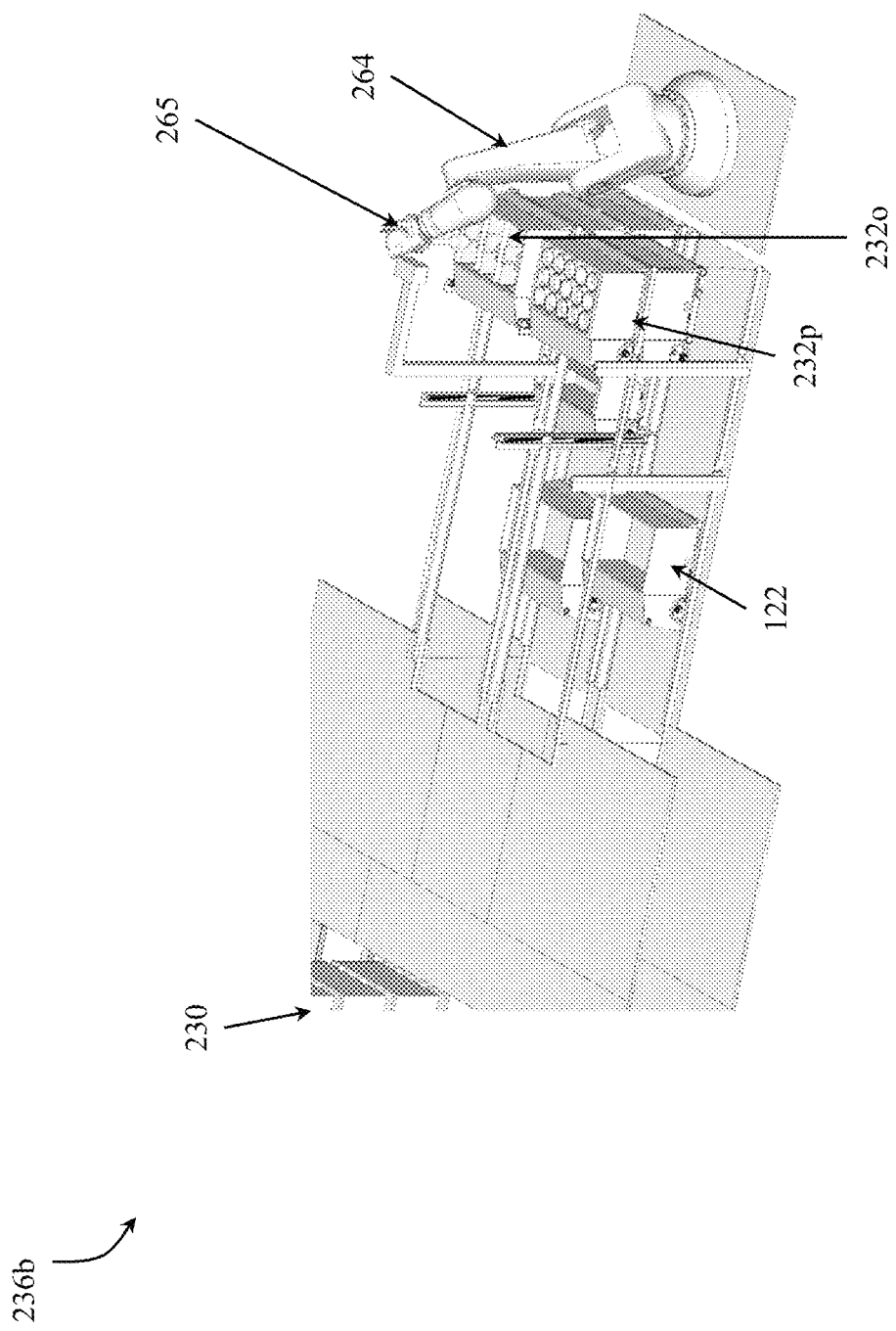
FIGS. 5A, 5B, 5C, and 5D are illustrative depictions of picking workstations with proxy pickers for use within the automated mobile robot storage and retrieval system.
Figure 5B:
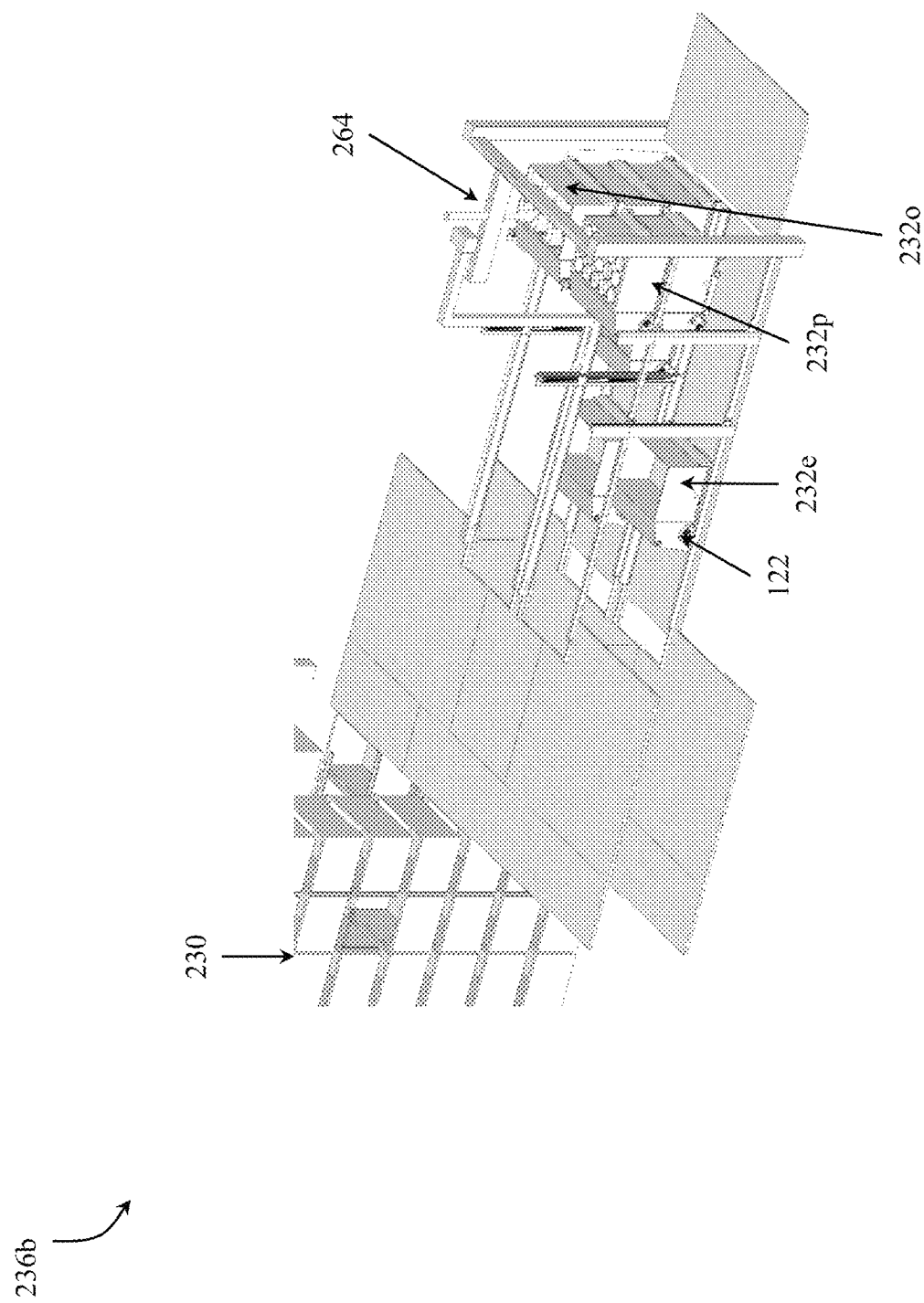
Figure 5C:
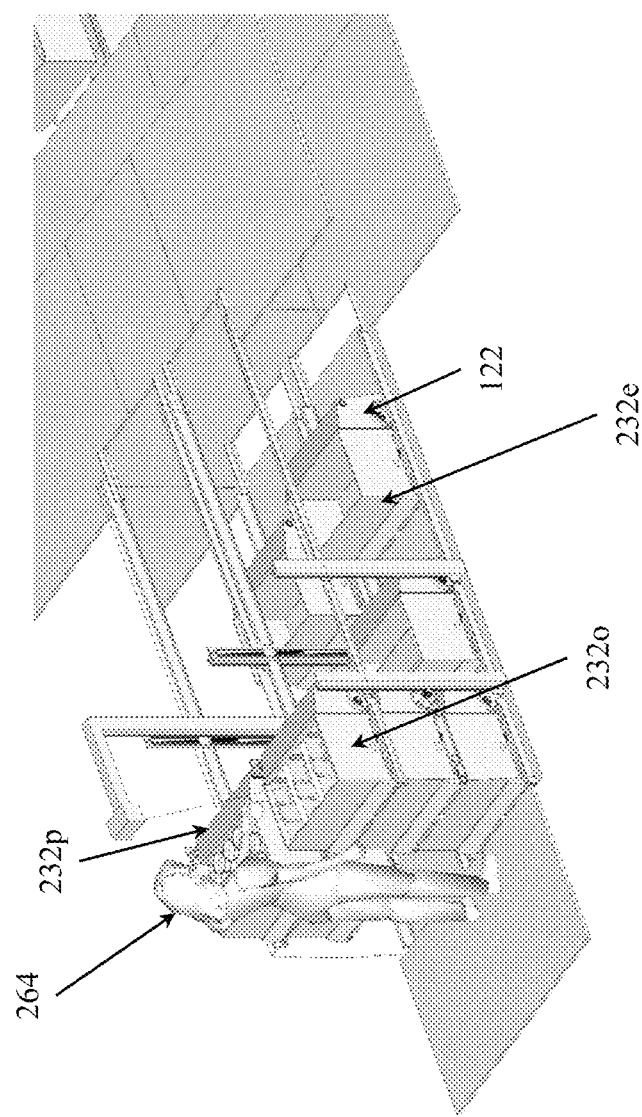
Figure 5D:
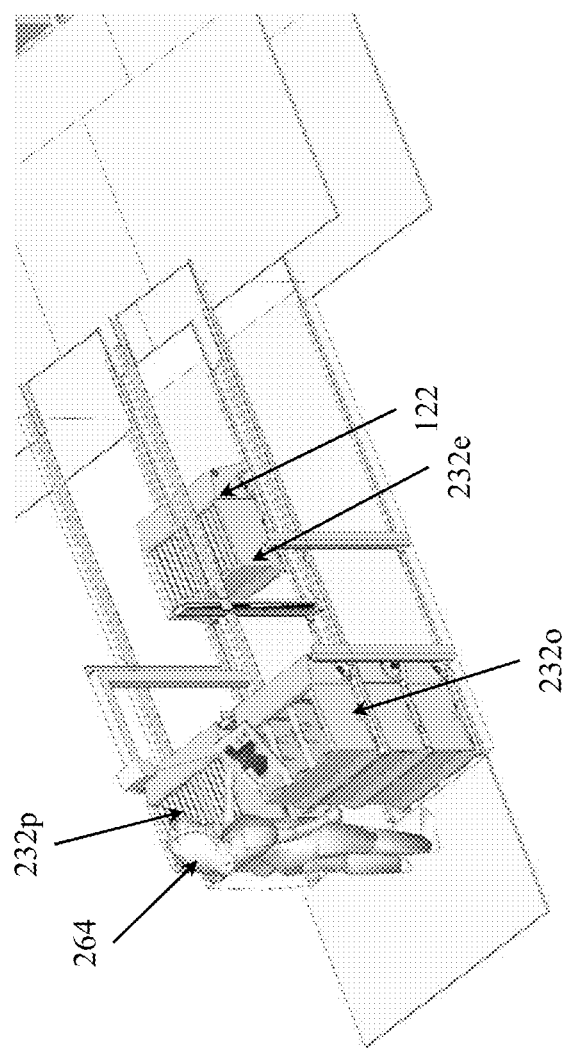

Continuing with FIGS. 5A-5D, the non-fungible goods picking workstation 236b further includes at least one proxy picker 264 assigned to the designated non-fungible goods picking workstations 236b, and the proxy picker 264 is instructed to retrieve eaches of goods from the product totes 232p delivered by the automated mobile robots, as selected by customers. As would be appreciated by one skilled in the art, the proxy pickers 264 can be any combination of manual human and automated opera orations. For example, the proxy picker 264 can be a human who receives input from the system 100 for which instructs which and how many eaches to retrieve from each delivered product tote 232p and place those eaches into the order tote 232o, as depicted in FIGS. 5C and 5D. For example, the automated inventory management system 100 can shine a light onto a particular sub-tote, indicating that a non-fungible good is to be selected from that sub-tote.

In accordance with an example embodiment of the present invention, the non-fungible goods picking workstations 236b include proxy picker 264 configured to retrieve eaches of non-fungible goods from sub-totes stored within product totes 232p, as depicted in FIG. 5A. The proxy picker 264 can include at least one gripper 265 configured to selectively retrieve a desired non-fungible good from one or more fungible goods stored at a picking station. As would be appreciated by one skilled in the art, the at least one gripper 265 can include any gripper 265 known in the art enabled to grab different dimensioned goods without damaging those goods. For example, the gripper 265 can be a six-axis robot picking articulate arm. Additionally, the automated proxy picker 264 can include interchangeable grippers 265 specialized for grasping different goods. As would be appreciated by one skilled in the art, the interchangeable grippers 265 can be swapped in advance of a product tote 232p arrival at the picking workstation 236 by analyzing and scheduling based on queued orders to be fulfilled. The proxy picker 264 can utilize the at least one gripper 265 to retrieve the appropriate each of a non-fungible good from the sub-tote of a product tote 232p and place it into an order tote 232o. As would be appreciated by one skilled in the art, the at least one gripper 265 can also be utilized to transfer one or more eaches to a "buffer" sub-tote such that a specific each of the non-fungible goods can be accessed (e.g., sorting through a stack of apples to a desired apple).

In accordance with an example embodiment of the present invention, the non-fungible goods picking workstations 236b include an automated Cartesian proxy picker 264 robot configured to pick eaches of non-fungible goods from sub-totes stored within product totes 232p, as depicted in FIG. 5B. The Cartesian proxy picker 264 can operate in a similar manner as the proxy picker 264 described with respect to FIG. 5A. In particular, the Cartesian proxy picker 264 includes at least one gripper 265 configured to retrieve a desired non-fungible good from one or more fungible goods stored at a picking station. Once identified, the Cartesian proxy picker 264 can utilize the at least one gripper 265 to pull the appropriate each of a non-fungible good from the sub-tote of a product tote 232p and place it into an order tote 232o. As would be appreciated by one skilled in the art, the Cartesian proxy picker 264 can utilize a "buffer" sub-tote such that a specific each of the non-fungible goods can be accessed (e.g., sorting through a stack of apples to a desired apple).

During the picking process, utilizing any combination of the processes from FIGS. 5A-5C, product totes 232p containing fungible goods are retrieved along with product totes 232p containing non-fungible goods. The fungible and non-fungible goods can be mixed in the customer's order tote 232o packed in order bags as the customer desires, as disclosed in related U.S. Provisional Application No. 62/452,801 filed on Jan. 31, 2017, which is incorporated herein by reference. Additionally, regardless of the combination of non-fungible and fungible goods, there does not need to be a later merge, or separate checkout for the non-fungible goods Once an order tote 232o has been filled with eaches, a mobile robot 122 will receive a task demand to either store the order tote 232o in the storage rack 230 structure, to a temporary storage location within the delivery fulfillment section 208, or transport it directly to a transfer station 242, as depicted in FIGS. 6A and 6B. The remaining steps in the product flow according to the disclosed embodiment involve the fulfillment of customer orders at each-picking workstations 236, and the transfer of completed orders to customers, as described in U.S. patent application Ser. No. 15/171,802 having a filing date of Jun. 2, 2016 and entitled "Storage and Retrieval System" and U.S. Application No. 62/444,693 which are hereby incorporated by reference in its entirety.

FIG. 6B depicts an exemplary example of a "curb side" or customer car transfer station 242 configuration. Similar to the structure in FIG. 6A, the customer car transfer station 242 configuration includes rails attached to the storage rack 230 that extend adjacent to one or more specialized temporary customer storage racks. The temporary customer storage racks are designed such that the mobile robots 122 can transfer the delivered order tote 232o to the temporary customer storage racks from the storage rack 230 attached rails, as depicted in FIG. 6B. Additionally, the temporary customer storage racks are configured adjacent to customer parking spaces, such that the customers can pull up to the designated locations and pick-up their respective orders from the temporary customer storage racks, or have their orders placed into the customer car by a store employee. As would be appreciated by one skilled in the art, if only a single order tote 232o retrieved from the storage rack 230 is designated for delivery, the consolidation step is skipped and the retrieving mobile robot 122 can transport the order tote 232o directly to a designated transfer station 242 within the delivery fulfillment section 208.

In operation, the utilization of proxy picking for non-fungible goods within a customer order begins with the decanting process. As discussed with respect to FIGS. 4A-4E all non-fungible goods received into inventory of an automated store 200 are captured and characterized through capturing images 216a and obtaining attributes 216 for each individual non-fungible good. Each individual non-fungible good is associated with a unique identifier and the images 216a and attribute data 216b for that good is stored in a database. After the data is ascertained for each individual non-fungible good, the goods are stored into specialized shaped sub-totes for storage in interchangeable product totes 232p, order totes 232o, or empty totes 232e and the product totes 232p, order totes 232o, or empty totes 232e are stored in storage racks 230 of the automated fulfillment system 204. The automated mobile robot storage and retrieval system 102 can track the locations and manage the inventory for all the non-fungible goods. With the non-fungible goods stored in inventory and characterized in the database, customers can be provided with access to detailed information for each individual non-fungible good from a remote application for selection as part of an order.

In accordance with an example embodiment of the present invention, the customers can access the information for all non-fungible goods available in the inventory for the automated store 200 from a graphical user interface of a shopping portal 217, as depicted in FIGS. 3A and 3B. The graphical user interface is provided to customers, for example, as a shopping terminal implemented in a combination of hardware and software. The shopping terminal can include in store shopping screens 216 or a web sales interface access from a customer's personal computing device (e.g., laptop, mobile device, etc.). For example, the user can access a virtual shopping terminal of the shopping portal 217 via a mobile app on their mobile device or through a web portal via a computer. Once within the graphical user interface of the shopping terminal, the customer can select a type of non-fungible good (e.g., apples, steaks, etc.) and then choose their attribute priorities to have those items presented first. For example, the customer can specify that they want apples presented to them based on 1) blemish density, 2) firmness, 3) color preference, 4) shape preference, 5) weight, etc. Additionally, the shopping portal provides a prioritization indicator enabling users to prioritize each of the one or more selection criteria. As would be appreciated by one skilled in the art, the attributes can be customized in any manner known in the art. For example, the customers can select their own grading criteria, the attributes can include weighting factors, or customers can input their own algorithm.

Once the attribute criteria is set for a selected type of non-fungible good provided, the user interface will provide the customer with all off the non-fungible goods that meet, or come closest to meeting, the attribute criteria for selection. In particular, on the ordering screens 216 the customer is able to view images 216a of non-fungible goods meeting their selected attribute priorities to select from, along with their respective attributes. For example, when a customer selects apples and a set of attributes, the automated inventory management system 100 provides a simple graphical user interface representation showing twelve apples that best match user selected attributes, as shown in FIG. 3A. As would be appreciated by one skilled in the art, the customer can be presented with any combination of two-dimensional and three-dimensions view(s) of the non-fungible goods. The customer will select one or more of the non-fungible goods to be added to their order for automated fulfillment.

In accordance with an example embodiment of the present invention, the customer can input attribute criteria for a type of non-fungible good and allow the CCS 116 to automatically select the non-fungible good to match that criteria for the customer. For example, if the customer has become comfortable with the results of non-fungible goods returned by the CCS 116 in response to certain set of criteria, the user can rely on the CCS 116 to automatically select those non-fungible goods for the customer and instruct the proxy picker 264 to retrieve them. Regardless of whether the customer actively makes the selection of non-fungible goods or allows the CCS 116 to select the non-fungible goods based on the customer's input attribute criteria, whether newly entered or retrieved from a profile or history, the CCS 116 will provide the proxy picker 264 instructions for which non-fungible goods to retrieve from the product totes 232*p*.

Once the selection is made, the system 100 places the specific selected non-fungible goods into their virtual cart. When a customer adds a non-fungible good to their cart (or allows the CCS 116 to add a non-fungible good), the good is reserved for a predetermined period of time before being released back into the available inventory. For example, if the customer does not complete the purchase of the order within five minutes, the non-fungible goods are released for selection by other customers. In summary, the shopping portal provides filters enabling users to enter the customer order selection having one or more selection criterion for a non-fungible good based on the attributes of each non-fungible good. The shopping portal provides a prioritization indicator enabling users to prioritize each of the one or more selection criterion. The shopping portal presents images of the non-fungible goods to users. A time-out feature can be provided in the shopping portal wherein once a user selects a non-fungible good for placement in a virtual shopping cart, a predetermined time period begins to elapse during which the non-fungible good is reserved and ineligible for selection by another user.

Once the customer has completed and paid for an order, the details of the order at transmitted to the automated fulfillment section 204 for fulfillment. In accordance with an example embodiment of the present invention, the CCS 116 receives input from the ordering screen 216, including customer order selections and the CCS 116 provides instruction to a proxy picker 264 at a picking workstation 238 to implement fulfillment of customers order selections. Based on the received instructions (e.g., electrical for automated or visual/audible for a human operator) the proxy picker 264 will retrieve a designated non-fungible good from the one or more non-fungible goods in a product tote 232*p* based on the one or more selection criterion of the customer order selection and place the designated non-fungible good into an order tote 232*o* of a delivery bundle, as discussed with respect to FIGS. 5A-5D. When the order is complete, the order totes 232*o* are delivered to the customer (e.g., as discussed with respect to FIGS. 6A and 6B).

In accordance with an alternative embodiment of the present invention, the proxy picker 264 can further include at least one processor configured to receive sensor input data and perform analytical processes to find a best match between one or more selection criterion of a customer order selection, and sensor input data correlating to the one or more selection criterion of a customer order. In particular, the proxy picker 264 can include an input/output means to communicate with the CCS 116 to identify which specific non-fungible good is the good that matches a customer selected attribute. For example, if a customer's attributes are for red apples of a certain weight, the proxy picker 264 will analyze the eaches of apples with the most red color within the defined weight range and retrieve those eaches for the customer. Once identified, the proxy picker 264 can utilize the at least one gripper 265 to retrieve the appropriate each of a non-fungible good from the sub-tote of a product tote 232*p* and place it into an order tote 232*o*. As would be appreciated by one skilled in the art, the attribute identification process performed by the proxy picker 264 can either supplement or replace the characterization process discussed with respect to FIGS. 4A-4E.

Figure 7:
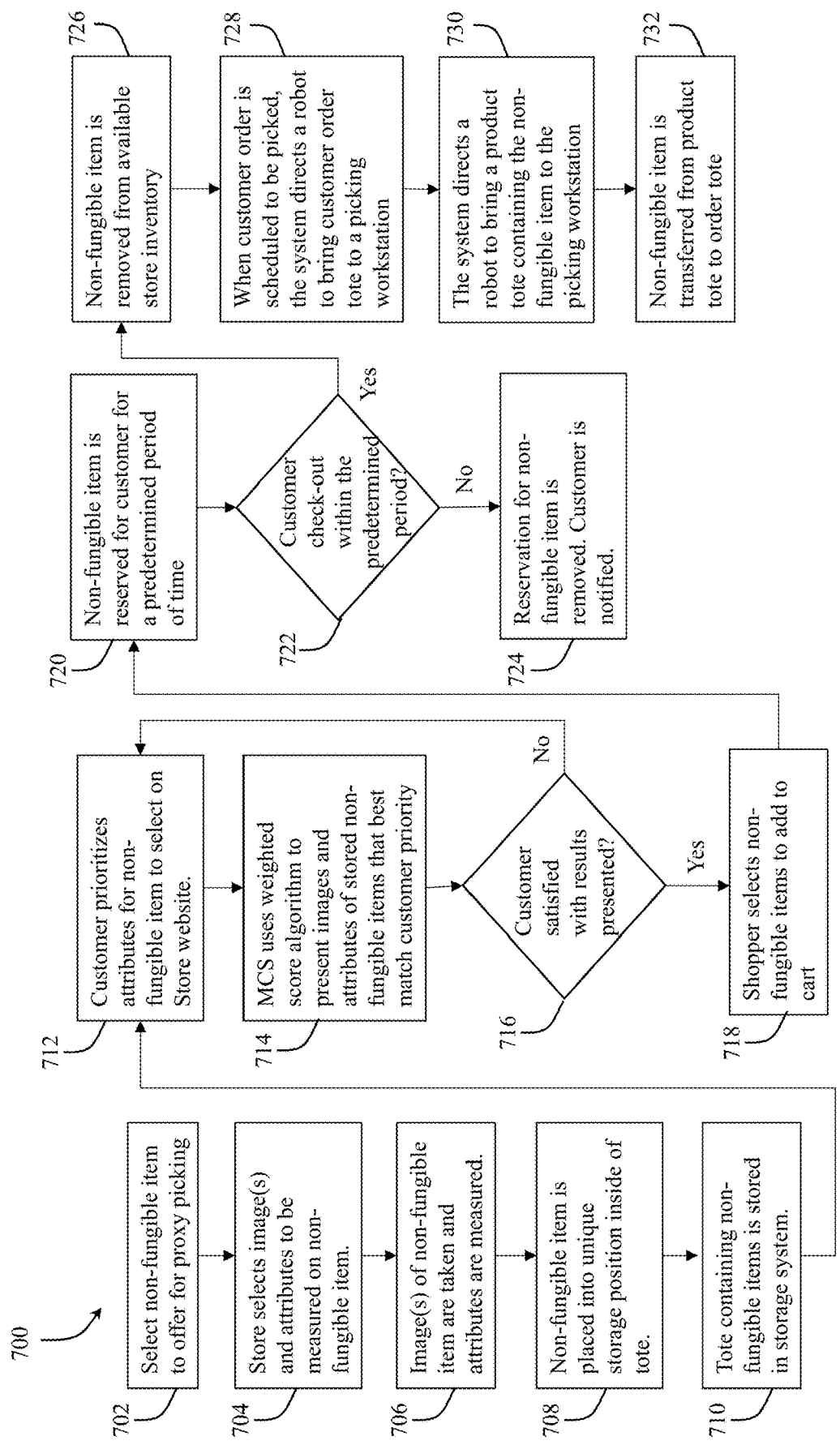
FIG. 7 is an illustrative flowchart depicting a method for utilizing proxy pickers for automated fulfillment of non-fungible goods within an automated mobile robot storage and retrieval system.

FIG. 7 shows an exemplary flow chart depicting implementation of the system and method of the present invention. Specifically, FIG. 7 depicts an exemplary flow chart showing the implementation of the method for managing non-fungible goods within an automated inventory management system, as discussed with respect to FIGS. 1-6B. In particular, FIG. 7 depicts a process 700 for implementing proxy picking of non-fungible goods within an automated fulfillment system 204. At step 702 the automated store 200 (e.g., via the automated mobile robot storage and retrieval system 102) selects non-fungible item(s) to offer for proxy picking. The non-fungible item selected by the automated store to be offered for proxy picking can include all of the non-fungible items available in the inventory, as dictated by the information stored in the database (e.g., Table 1).

At step 704 the automated store 200 selects image(s) 216*a* and attributes 216*b* to be measured on non-fungible item. At any time, the shopper may include feedback to be used to modify selections over time. In particular, step 704 defines the types of images 216*a* and types of attributes 216*b* to be ascertained for received non-fungible goods. At step 706 the image(s) of non-fungible item are taken and attributes are measured, preferably with an automated system. Image(s) and attribute data are stored in the non-fungible database. In particular, step 706 provides the process for when non-fungible goods are received into inventory and characterized through the automated decanting process, discussed with respect to FIGS. 4A-4E.

At step 708, after completion of obtaining the image(s) 216*a* and attributes 216*b*, the non-fungible item is placed into unique storage position inside of a product tote 232*p* (e.g., a. specific position in tube or slot sub-tote), preferably with automation or light directed manual placement directed by the system 102. Additionally, at step 708, the position of item in product tote 232*p* is stored in the database. At step 710 the product tote 232*p* containing the non-fungible items is stored in storage rack 230 and the product tote 232*p* location is stored in the database. At step 712 a customer prioritizes attributes for a non-fungible item to select on a shopping screen 216. At step 714 the system 102 uses a weighted score algorithm to present images 216*a* and attributes 216*b* of stored non-fungible items that best match the customer's specified priority attributes.

At step 716 the retrieval system 102 confirms whether or not the customer is satisfied with the results presented. If no, the process 700 returns to step 712 and provides a new list of non-fungible items, or allows the shopper to modify their selection preferences. If yes, the process 700 advances to step 718. At step 718 the customer selects one or more non-fungible items to add to their virtual shopping cart for an order. Optionally, steps 716 and 718 can be replaced with the customer electing the allow the CSS 116 to make the selection of fungible goods on their behalf, based on the customers input attribute criteria. At step 720 the selected one or more non-fungible items are reserved for the customer for a predetermined period of time. At step 722 the retrieval system 102 determines whether the customer has checked out the virtual cart in the predetermined period of time. If not, the process advances to step 724 where the reservation of the non-fungible items are removed. Additionally, the customer will be notified that their shopping cart has expired and that the previously selected non-fungible items have been returned to available inventory.

If at step 722 the customer has checked out within the predetermined period of time, the process advances to step 726. At step 726 the non-fungible item is permanently removed from the available inventory at the automated store 200. At step 728, when the customer order is scheduled to be picked, the system 102 directs an automated mobile robot 122 to bring a customer order tote 232o to a picking workstation 236. At step 730 the system 102 directs a mobile robot 122 to bring a product tote 232p containing the selected non-fungible item(s) to the picking workstation 236 for proxy picking. At step 732 the selected non-fungible item is transferred from the product tote 232p to the customer's order tote 232o, preferably with automation or light directed manual movement directed by the retrieval system 102. The process in steps 730 and 732 is repeated until all non-fungible items in the customer order are provided within the customer's order tote 232o, and the order tote 232o is delivered to the customer.

Figure 8:
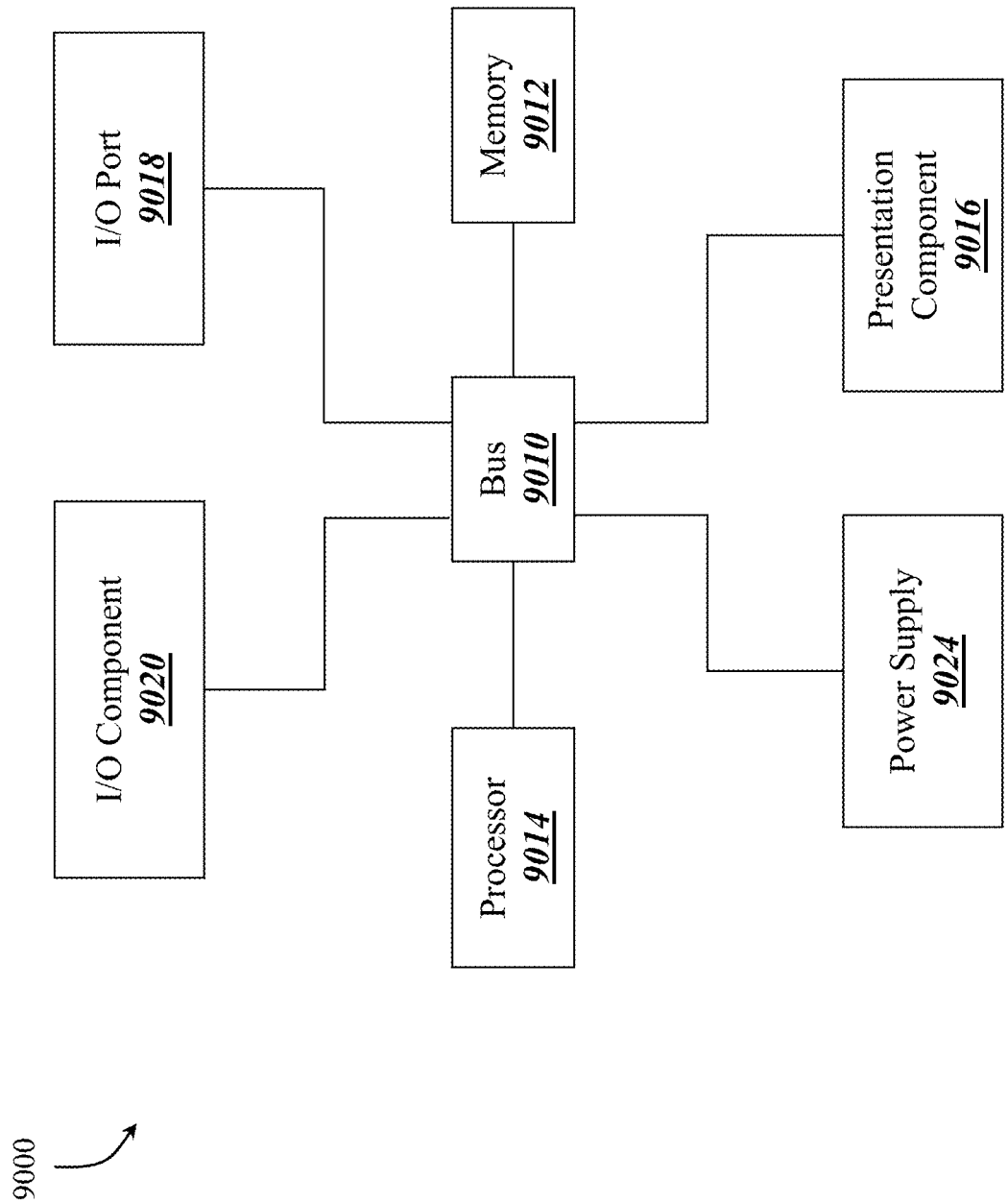
FIG. 8 is a diagrammatic illustration of a high level architecture for implementing processes described herein.

Any suitable computing device can be used to implement the computing devices 104, 124, 122, 262 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 9000 is depicted in FIG. 8. The computing device 9000 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 9000 is depicted for illustrative purposes, embodiments of the present invention may utilize any number of computing devices 9000 in any number of different ways to implement a single embodiment of the present invention. Accordingly, embodiments of the present invention are not limited to a single computing device 9000, as would be appreciated by one with skill in the art, nor are they limited to a single type of implementation or configuration of the example computing device 9000.

The computing device 9000 can include a bus 9010 that can be coupled to one or more of the following illustrative components, directly or indirectly: a memory 9012, one or more processors 9014, one or more presentation components 9016, input/output ports 9018, input/output components 9020, and a power supply 9024. One of skill in the art will appreciate that the bus 9010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 9000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 9000.

The memory 9012 can include computer-storage media in the form of volatile and/or nonvolatile memory. The memory 9012 may be removable, non-removable, or any combination thereof. Exemplary hardware devices are devices such as hard drives, solid-state memory, optical-disc drives, and the like. The computing device 9000 can include one or more processors that read data from components such as the memory 9012, the various I/O components 9016, etc. Presentation component(s) 9016 present data indications to a user or other device. Exemplary presentation components include a display device, speaker, printing component, vibrating component, etc.

The I/O ports 9018 can enable the computing device 9000 to be logically coupled to other devices, such as I/O components 9020. Some of the I/O components 9020 can be built into the computing device 9000. Examples of such I/O components 9020 include a microphone, joystick, recording device, game pad, satellite dish, scanner, printer, wireless device, networking device, and the like. The memory may be stored in a cloud database where data across multiple stores in stored, and may be used to efficiently replenish inventory between stores and perform data analytics; e.g. shopper buying patterns and preferences.

In accordance with the present invention, an automated store is provided, the store comprising: a mock marketplace that presents fungible goods and non-fungible goods to customers for order selection, the order selection comprising one or more selection criterion distinguishing similar one or more non-fungible goods from each other; one or more picking workstations that receive the one or more non-fungible goods for picking custom-picked selections; a proxy picker disposed at the one or more picking workstations; a central control system (CCS) that manages automated processes in the automated store, receives input from the mock marketplace including customer order selections, and provides instruction to the proxy picker to implement fulfillment of customer order selections; wherein when the CCS receives the one or more selection criterion from a customer, the CCS returns one or more fungible goods matching the one or more selection criterion to the customer and the customer provides a customer order selection for a customer designated non-fungible good; and wherein the customer order selection is communicated via the CCS to the proxy picker, and the proxy picker automatically retrieves the customer designated non-fungible good from the one or more non-fungible goods and places the designated non-fungible good into a tote of a delivery bundle.

A mobile robot operating in delivery mode can retrieve the delivery bundle and deliver the delivery bundle to a delivery section of the automated store.

A mobile robot operating in delivery mode can retrieve the delivery bundle and deliver the delivery bundle to a designated location of a transfer station located in a delivery section of the automated store.

The store can include an automated fulfillment section comprising: a storage structure comprising a plurality of rack modules separated by aisles and having a plurality of storage levels, the storage structure storing a plurality of totes that are empty totes when empty, product totes when containing eaches, and order totes when containing orders, or combinations thereof.

The store can further include a shopping section in which the mock marketplace is located, the shopping section comprising one or more shopping terminals for selecting one or more fungible, one or more non-fungible goods, or both, goods from the mock marketplace. The one or more shopping terminals can include an interactive hardware display with user interface enabling the intake and implementation of the customer order selection. The one or more shopping terminals can include virtual terminals displayed via a mobile application operating on a user device enabling the intake and implementation of the customer order selection.

The store can further include automated decanting robots, wherein a controller of the automated decanting robots receives input from an optical sensor device oriented at and receiving optical data from the one or more non-fungible goods. The optical sensor device can be an optical spectrometer. The optical sensor device can be a digital camera. The optical sensor device can be integrated with the automated decanting robots. The optical sensor device can be in communication with the automated decanting robots and enabled to transfer data therebetween. The optical sensor device can generate data that serves as a basis for analyzing subject non-fungible goods for the one or more selection criterion. The decanting robots can receive input from a weight sensor device receiving weight data from the one or more non-fungible goods. The automated decanting robots can receive input from a touch sensor device receiving firmness data from the one or more non-fungible goods. The automated decanting robots can receive input from a chemical sensor device receiving odor or gas emission data from the one or more non-fungible goods.

One or more selection criterion can be selected from the group consisting of color, firmness, size, weight, and defects.

The store can further include a checkout section, the checkout section comprising one or more non-fungible goods drop-off stations receiving one or more non-fungible goods picked by the proxy picker from the one or more picking workstations.

The store can further include one or more checkout terminals having a configuration enabling the customers to render payment for the fungible goods and the one or more non-fungible goods. The one or more checkout terminals can be physical kiosk structures, or virtual terminals displayed via a mobile application operating on a user device.

The store can further include a delivery section having a merge module that combines one or more fungible goods from an automated fulfillment section with the one or more non-fungible goods picked from a shopping section into a delivery bundle. A pickup station can receive the delivery bundle and store the delivery bundle in an assigned location until a customer arrives to take delivery of the delivery bundle.

The store can further include a non-fungible item database accessible by the CCS, the non-fungible item database storing attributes of each non-fungible good of the non-fungible goods located in the automated store correlated to a tote and/or sub-tote in which it is stored. A data acquisition device can automatically captures all ascertainable attributes of the non-fungible goods and records the ascertainable attributes in the non-fungible item database. Possible attributes of each non-fungible good can be selected from the group consisting of color, firmness, size, weight, and defects. Each non-fungible good of the non-fungible goods can be stored in a specialized sub-tote configured to store the non-fungible good with an identifier correlated to the non-fungible good, wherein the identifier is associated with the non-fungible good in the non-fungible item database and is associated with attributes of the non-fungible good. The specialized sub-tote can be a grid compartment or a tube.

The store can further include a shopping portal that is accessible via the Internet. The shopping portal can present the non-fungible goods to users in association with attributes of each non-fungible good of the non-fungible goods. The shopping portal can provide filters enabling users to enter the customer order selection having one or more selection criterion for a non-fungible good based on the attributes of each non-fungible good. The shopping portal can provide a prioritization indicator enabling users to prioritize each of the one or more selection criterion. The shopping portal can present images of the non-fungible goods to users. A timeout feature can be provided wherein once a user selects a non-fungible good for placement in a virtual shopping cart, a predetermined time period begins to elapse during which the non-fungible good is reserved and ineligible for selection by another user. When a purchase of items is not completed prior to the predetermined time period terminating, the non-fungible good can become available for selection again by another user.

The store can further include an each good management mechanism wherein when a plurality of each goods are in a tube shaped sub-tote, the proxy picker moves at least one each good out of the way from above a selected each good in the tube shaped sub-tote, stores the at least one each good in a different tube shaped sub-tote, and updates a position of the at least one each good.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

APPENDIX A

| Food | Non-fungible | Future Non-fungible | Fungible | Tote Storage Method | Atribute 1 | Attribute 2 | Attribute 3 | Attribute 4 | Attribute 5 |
|---|---|---|---|---|---|---|---|---|---|
| Bread | | X | | Subtote | | | | | |
| Deli Meat | | | X | Subtote | Weight | | | | |
| Deli Cheese | | | X | Subtote | Weight | | | | |
| Apples | X | | | Tube | Defects | Shape | Color | Firmness | Weight |
| Bananas | X | | | Subtote | Defects | Shape | Color | Firmness | Weight |
| Berries | | X | | Subtote | Weight | | | | |
| Grapes | | X | | Subtote | Weight | | | | |
| Tomatoes | X | | | Tube | Defects | Shape | Color | Firmness | Weight |
| Cherry Tomatoes | | X | | Subtote | | | | | |
| Pears | X | | | Tube | Defects | Shape | Color | Firmness | Weight |
| Oranges | X | | | Tube | Defects | Shape | Color | Firmness | Weight |
| Lemon | X | | | Tube | Defects | Shape | Color | Firmness | Weight |
| Limes | X | | | Tube | Defects | Shape | Color | Firmness | Weight |
| Kiwi | X | | | Tube | Defects | Shape | Color | Firmness | Weight |
| Dates | | X | | Subtote | | | | | |
| Cantalope | X | | | Tube | Defects | Shape | Color | Firmness | Weight |
| Mangos | X | | | Tube | Defects | Shape | Color | Firmness | Weight |
| Peaches | X | | | Tube | Defects | Shape | Color | Firmness | Weight |
| Carrots | | X | | Subtote | Weight | | | | |
| Cilantro | | X | | Subtote | | | | | |
| Green Onions | | X | | Subtote | Weight | | | | |
| Cabbage | | X | | Subtote | | | | | |
| Celery | | X | | Subtote | | | | | |
| Kale Greens | | X | | Subtote | | | | | |
| Cauliflower | | X | | Subtote | | | | | |
| Potatoes | | X | | Subtote | Weight | | | | |
| Brocolli | | X | | Subtote | | | | | |
| Avoccados | X | | | Tube | Defects | Shape | Color | Firmness | Weight |
| Cucumbers | X | | | Tube | Defects | Shape | Color | Firmness | Weight |
| Parsley | | X | | Subtote | | | | | |
| Mushrooms | | X | | Subtote | | | | | |
| Lettuce | | X | | Subtote | | | | | |
| Onions | X | | | Tube | Defects | Shape | Color | Firmness | Weight |
| Peppers | X | | | Tube | Defects | Shape | Color | Firmness | Weight |
| Zucchini | X | | | Tube | Defects | Shape | Color | Firmness | Weight |
| Sliced Mushrooms | | X | | Subtote | | | | | |

APPENDIX A-continued

| Food | Non-fungible | Future Non-fungible | Fungible | Tote Storage Method | Atribute 1 | Attribute 2 | Attribute 3 | Attribute 4 | Attribute 5 |
|---|---|---|---|---|---|---|---|---|---|
| Leeks | | X | | Subtote | | | | | |
| Romaine Lettuce | | X | | Subtote | | | | | |
| Squash | X | | | Tube | Defects | Shape | Color | Firmness | Weight |
| Beets | X | | | Tube | Defects | Shape | Color | Firmness | Weight |
| Asparagus | | X | | Subtote | | | | | |
| Garlic | | X | | Subtote | | | | | |
| Green Beans | | X | | Subtote | | | | | |
| Jalapenos | | X | | | | | | | |
| Artichokes | | X | | | Weight | | | | |
| Eggplant | X | | | Subtote | Defects | Shape | Color | Firmness | Weight |
| Ginger | | X | | Subtote | Weight | | | | |
| Snow Peas | | X | | Subtote | Weight | | | | |
| Watercress | | X | | Subtote | Weight | | | | |
| Dried Shitake Mushrooms | | X | | Subtote | | | | | |
| Spinach | | X | | Subtote | | | | | |
| Ear Corn | | X | | Subtote | Defects | Shape | Color | Firmness | Weight |
| Pumpkins | X | | | Subtote | Defects | Shape | Color | Firmness | Weight |
| Sage | | X | | Subtote | | | | | |
| Mint | | X | | Subtote | | | | | |
| Oregano | | X | | Subtote | | | | | |
| Basil | | X | | Subtote | | | | | |
| Thyme | | X | | Subtote | | | | | |
| Rosemary | | X | | Subtote | | | | | |
| Nuts | | X | | Subtote | Weight | | | | |
| Tofu | | | X | Subtote | Weight | | | | |
| Sushi | | | X | Subtote | | | | | |
| Fish Filleted | X | | | Slot | Weight | Color | Firmness | Shape | |
| Fish Whole | X | | | Slot | Weight | Color | Firmness | Shape | |
| Fish Packaged | | | X | Subtote | Weight | | | | |
| Shrimp Bulk | X | | | Subtote | Weight | | | | |
| Shrimp Packaged | | | X | Subtote | | | | | |
| Crabcakes | | | X | Subtote | | | | | |
| Lobster | X | | | Subtote | Weight | Color | Firmness | Shape | |
| Crab Clusters | X | | | Subtote | Weight | Color | Firmness | Shape | |
| Mussels | | X | | Subtote | Weight | | | | |
| Oysters | | X | | Subtote | Weight | | | | |
| Whole Crabs | | X | | Subtote | Weight | | | | |
| Live Crawfish | | X | | Subtote | Weight | | | | |
| Steamers | | | X | Subtote | Weight | | | | |
| Steaks | X | | | Slot | Weight | Marbling | Color | Firmness | Shape |
| Roasts | X | | | Subtote | Weight | Marbling | Color | Firmness | Shape |
| Ribs | X | | | Slot | Weight | Marbling | Color | Firmness | Shape |
| Cube and Stew Meat | | X | | Subtote | Weight | | | | |
| Fajita Meat | | X | | Subtote | Weight | | | | |
| Ground Beef | | X | | Subtote | Weight | | | | |
| Burgers | | X | | Subtote | Weight | | | | |
| Burgers Frozen | | | X | Subtote | | | | | |
| Brisket | X | | | Subtote | Weight | Marbling | Color | Firmness | Shape |
| Ham | X | | | Subtote | Weight | Marbling | Color | Firmness | Shape |
| Pork Chops | X | | | Slot | Weight | Marbling | Color | Firmness | Shape |
| Pork Roasts | X | | | Subtote | Weight | Marbling | Color | Firmness | Shape |
| Whole Chicken | X | | | Subtote | Weight | Marbling | Color | Firmness | Shape |
| Chicken Packaged | X | | | Slot | Weight | Marbling | Color | Firmness | Shape |
| Chicken Livers | | | X | Subtote | Weight | | | | |
| Ground Chicken | | X | | Subtote | Weight | | | | |
| Chicken Frozen | | | X | Subtote | Weight | | | | |
| Hot Dogs | | | X | Subtote | | | | | |
| Bacon | | | X | Subtote | | | | | |
| Sausage | | | X | Subtote | Weight | | | | |
| Dairy | | | X | Subtote | | | | | |
| Eggs | | X | | Subtote | | | | | |
| Frozen | | | X | Subtote | | | | | |
| Wine | | | X | Subtote | | | | | |

What is claimed is:

1. An automated system, comprising:
an automated decanting station for receiving new inventory into the automated system, the new inventory comprising non-fungible goods, the automated decanting station comprising a plurality of sensors for sensing attribute data about different ones of a plurality of same-type non-fungible goods, the sensed attribute data comprising:

an image of each of the non-fungible goods, and
one or more of a firmness of each of the non-fungible goods, defects in each of the non-fungible goods, a weight of each of the non-fungible goods, and an odor of each of the non-fungible goods;

a plurality of specialized sub-totes that are customized to fit non-fungible goods of different and identified shapes and sizes, non-fungible goods from the automated decanting station being loaded into corresponding fitting sub-totes of the plurality of specialized sub-totes based on the shape and size of the non-fungible goods;

a plurality of storage locations for storing totes containing the specialized sub-totes including the non-fungible goods; and a central control system (CCS) configured to:

store the attribute data, publish the attribute data for each of the plurality of same-type non-fungible goods for review by customers, and presenting an option to choose between any of the plurality of same-type non fungible goods;

receive an order for a particular non-fungible good of the plurality of same-type non-fungible goods based on a customer reviewing the attribute data for the plurality of same-type non-fungible goods, and direct retrieval of the particular non-fungible good upon receipt of the order from a storage location where the particular non-fungible good is stored by an automated fulfillment system.

2. The automated system of claim 1, wherein the CCS stores an identity of the sub-tote and tote in association with the particular non-fungible good.

3. The automated system of claim 2, wherein the CCS stores a location of the particular non-fungible good in the sub-tote relative to other non-fungible goods in the sub-tote.

4. The automated system of claim 1, wherein the CCS assigns each of the plurality of non-fungible goods a unique identifier, the CCS identifying the unique identifier of the particular non-fungible good in the received order, identifying the storage location for the particular non-fungible good with that unique identifier, and directing retrieval of the particular non-fungible good with that unique identifier by the automated fulfillment system.

5. The automated system of claim 1, further comprising a shopping section including a plurality of shopping terminals, the shopping terminals presenting the attribute data for each of the plurality of non-fungible goods.

6. The automated system of claim 1, the CCS comprising or in communication with a server configured to present a graphical display including the attribute data for each of the plurality of non-fungible goods.

7. The automated system of claim 1, wherein the automated decanting station comprises a plurality of interchangeable and gripping devices, wherein different gripping devices are used for different non-fungible goods.

8. The automated system of claim 1, wherein the one or more sensors comprise one or more of:

an optical sensor for capturing images of the non-fungible goods, a weight sensor for sensing a weight of each of the non-fungible goods, a touch sensor for sensing the firmness of each of the non-fungible goods and a chemical sensor for sensing the odor or gas emitted by each of the non-fungible goods.

9. The automated system of claim 1, wherein, in directing retrieval of the particular non-fungible good from the storage location, the CCS tasks a mobile robot to travel to the storage location where the tote is stored to retrieve the particular non-fungible good.

10. The automated system of claim 9, wherein the tote is a first tote, the automated system further comprising a picking station wherein the particular non-fungible good is transferred from the first tote to a second tote.

11. The automated system of claim 10, further comprising a proxy picker for transferring the particular non-fungible good from the first tote to the second tote.

12. The automated system of claim 11, where the proxy picker is an automated proxy picker.

13. The automated system of claim 10, wherein other items ordered by the customer in addition to the particular non-fungible good are transferred into the second tote at the picking station.

14. The automated system of claim 13, wherein the other items comprise fungible and/or non-fungible goods retrieved from the storage locations of the order fulfillment system.

15. The automated system of claim 14, further comprising a delivery fulfillment system receiving the second tote comprising at least the particular non-fungible good.

16. An automated system, comprising:

a plurality of specialized sub-totes that are customized to fit a plurality of non-fungible goods of different and identified shapes and sizes, select ones of the non-fungible goods of the plurality of non-fungible goods being loaded into corresponding fitting sub-totes of the plurality of specialized sub-totes based on the shape and size of the non-fungible goods;

a storage area for storing the plurality of specialized sub-totes; and a central control system (CCS) configured to:

store attribute data relating to attributes of each of the plurality of non-fungible goods, the plurality of non-fungible goods each being the same type of non-fungible good, the attribute data enabling a customer to distinguish between different non-fungible goods of the plurality of fungible goods, publish the attribute data for each of the plurality of non-fungible goods for review by customers, receive an order from a customer including desired attributes for a non-fungible good the customer wishes to purchase, distinguish between different ones of the same-type non-fungible goods to identify which one of the same-type non-fungible goods in stock most closely matches with the desired attributes in the order from the customer, and direct retrieval of the identified, closest match non-fungible good upon receipt of the order from a storage location where the non-fungible good is stored by an automated fulfillment system.

17. The automated system of claim 16, wherein the order received from a customer further comprises a weighting of the desired attributes, which weighting is used by the CCS in determining the non-fungible good for customer purchase.

18. The automated system of claim 16, wherein the non-fungible good is stored in a container, the CCS storing a position of the non-fungible good in the container.

19. The automated system of claim 16, wherein the CCS assigns each of the plurality of non-fungible goods a unique identifier, the CCS identifying the unique identifier of the non-fungible good determined for purchase, identifying the storage location for the non-fungible good with that unique identifier, and directing retrieval of the non-fungible good with that unique identifier by the automated fulfillment system.

20. The automated system of claim 16, wherein, in directing retrieval of the non-fungible good from the storage location, the CCS tasks a mobile robot to travel to the storage location where the tote is stored to retrieve the non-fungible good.

21. The automated system of claim 16, wherein the non-fungible goods are stored in a first container at the storage location, the automated system further comprising a picking station receiving the first container upon determining the non-fungible good for purchase by the customer and transferring the non-fungible good from the first container to a second container customized with the customer's order.

22. The automated system of claim 21, further comprising a proxy picker for transferring the non-fungible good from the first container to the second container.

23. The automated system of claim 21, wherein the proxy picker is an automated proxy picker.

24. The automated system of claim 16, further comprising a shopping section including a plurality of shopping terminals, the shopping terminals presenting the attribute data for each of the plurality of non-fungible goods.

25. The automated system of claim 16, the CCS comprising or in communication with a server configured to present a graphical display including the attribute data for each of the plurality of non-fungible goods.

26. The automated system of claim 16, further comprising one or more sensors for sensing the attribute data of each of a plurality of non-fungible goods.

* * * * *